United States Patent
Gadda et al.

(10) Patent No.: US 10,407,035 B1
(45) Date of Patent: *Sep. 10, 2019

(54) INTEGRATED CHASSIS CONTROL

(71) Applicant: Apple Inc., Cupertino, CA (US)

(72) Inventors: Christopher D. Gadda, Palo Alto, CA (US); Carlos Alberto De Magalhaes Massera Filho, Santa Clara, CA (US); David A. Stronks, San Jose, CA (US); Gabriel M. Hoffmann, Mountain View, CA (US); Miroslav Baric, San Jose, CA (US); Nathaniel B. Honka, Santa Clara, CA (US); Stefan Solyom, San Jose, CA (US); Timothee J. Cazenave, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 15/667,699

(22) Filed: Aug. 3, 2017

Related U.S. Application Data

(60) Provisional application No. 62/398,788, filed on Sep. 23, 2016, provisional application No. 62/398,758, (Continued)

(51) Int. Cl.
*B60T 8/1755* (2006.01)
*B60W 10/184* (2012.01)
(Continued)

(52) U.S. Cl.
CPC ......... *B60T 8/1755* (2013.01); *B60W 10/184* (2013.01); *B60W 10/20* (2013.01);
(Continued)

(58) Field of Classification Search
CPC ... B60T 8/1755; B60W 10/184; B60W 10/20; B60W 2520/14; B62D 6/003;
(Continued)

(56) References Cited

U.S. PATENT DOCUMENTS

| 5,480,219 A * | 1/1996 | Kost | B60T 8/172 |
|---|---|---|---|
| | | | 303/146 |
| 7,027,903 B2 * | 4/2006 | Meyers | B60T 7/12 |
| | | | 303/189 |

(Continued)

FOREIGN PATENT DOCUMENTS

EP 625946 B1 9/1996

OTHER PUBLICATIONS

Beal, Craig E., "Applications of Model Predictive Control to Vehicle Dynamics for Active Safety and Stability", Stanford University, Department of Mechanical Engineering and Committee on Graduate Studies, Jul. 2011, 155 pp.

*Primary Examiner* — Courtney D Heinle
(74) *Attorney, Agent, or Firm* — Young Basile Hanlon & MacFarlane, P.C.

(57) ABSTRACT

A control system for a vehicle includes a plurality of vehicle actuators that are operable to affect actual chassis-level accelerations, a vehicle intelligence unit that determines a motion plan, a vehicle motion control unit that determines a chassis-level motion request based on the motion plan, and a chassis control unit that determines actuator commands for the plurality of vehicle actuators based on the chassis-level motion request.

18 Claims, 15 Drawing Sheets

Related U.S. Application Data filed on Sep. 23, 2016, provisional application No. 62/370,351, filed on Aug. 3, 2016.

(51) Int. Cl.
| | |
|---|---|
| *B60W 10/20* | (2006.01) |
| *B62D 6/00* | (2006.01) |
| *B62D 15/02* | (2006.01) |
| *G05D 1/02* | (2006.01) |
| *G05D 1/08* | (2006.01) |
| *B62D 37/00* | (2006.01) |

(52) U.S. Cl.
CPC ........... *B62D 6/003* (2013.01); *B62D 15/025* (2013.01); *G05D 1/021* (2013.01); *G05D 1/0891* (2013.01); *B60G 2400/0523* (2013.01); *B60G 2400/10* (2013.01); *B60W 2520/14* (2013.01); *B62D 37/00* (2013.01); *G05D 2201/0213* (2013.01)

(58) Field of Classification Search
CPC ...... B62D 15/025; B62D 37/00; G05D 1/021; G05D 1/0891; G05D 2201/0213; B60G 2400/0523; B60G 2400/10
See application file for complete search history.

(56) References Cited

U.S. PATENT DOCUMENTS

| | | | |
|---|---|---|---|
| 7,035,726 B2* | 4/2006 | Sakata | B60T 8/1755 180/410 |
| 7,062,382 B2* | 6/2006 | Courtenay | B60T 8/17557 303/146 |
| 7,130,735 B2 | 10/2006 | Brown et al. | |
| 7,191,046 B2* | 3/2007 | Kin | B60T 8/1755 701/70 |
| 7,260,459 B2* | 8/2007 | Imaizumi | B60T 8/1755 701/41 |
| 7,359,787 B2* | 4/2008 | Ono | B60G 17/016 180/197 |
| 7,373,236 B2* | 5/2008 | Matsuno | B60T 8/1755 701/80 |
| 7,676,307 B2* | 3/2010 | Schmitt | B60T 8/172 701/38 |
| 7,853,366 B2 | 12/2010 | Imura et al. | |
| 8,050,822 B2* | 11/2011 | Takenaka | B60T 8/1755 303/146 |
| 8,239,099 B2* | 8/2012 | Iwasaka | B60T 8/17557 348/119 |
| 8,355,844 B2* | 1/2013 | Mori | B60W 10/06 701/36 |
| 8,386,119 B2* | 2/2013 | Kobayashi | B60G 17/0195 180/167 |
| 8,457,858 B2* | 6/2013 | Matsuno | B60W 30/00 701/1 |
| 8,655,563 B2* | 2/2014 | Maeda | B60T 8/1755 180/282 |
| 8,886,434 B2* | 11/2014 | O'Dea | B60W 30/02 701/70 |
| 9,061,663 B2* | 6/2015 | Wu | B60T 8/1708 |
| 9,081,387 B2* | 7/2015 | Bretzigheimer | B60T 1/10 |
| 2003/0225494 A1* | 12/2003 | Coelingh | B60G 17/0195 701/48 |
| 2003/0225495 A1* | 12/2003 | Coelingh | B60G 17/0195 701/48 |
| 2007/0162203 A1* | 7/2007 | Yasutake | B60W 10/04 701/38 |
| 2008/0086248 A1* | 4/2008 | Lu | B60T 8/171 701/41 |
| 2009/0093933 A1* | 4/2009 | Kim | B60W 50/00 701/46 |
| 2009/0112404 A1* | 4/2009 | Imura | B60W 30/04 701/41 |
| 2010/0228427 A1* | 9/2010 | Anderson | B60W 30/09 701/31.4 |
| 2011/0112716 A1* | 5/2011 | Joeng | B60W 50/0205 701/31.4 |
| 2011/0166744 A1* | 7/2011 | Lu | B60T 8/1755 701/29.2 |
| 2011/0196579 A1* | 8/2011 | Tokimasa | B60W 10/184 701/48 |
| 2013/0096766 A1* | 4/2013 | Park | B60T 8/1755 701/23 |
| 2014/0249721 A1* | 9/2014 | Schindler | B60W 10/04 701/41 |
| 2015/0051778 A1* | 2/2015 | Mueller | B60W 50/029 701/23 |
| 2015/0218872 A1* | 8/2015 | Breed | G01C 21/26 701/2 |
| 2017/0199524 A1* | 7/2017 | Lazarevych | B62D 15/025 |
| 2018/0162390 A1* | 6/2018 | Miura | B60W 50/029 |
| 2018/0210464 A1* | 7/2018 | Switkes | G05D 1/0295 |
| 2018/0348769 A1* | 12/2018 | Sato | G05D 1/0214 |
| 2019/0023239 A1* | 1/2019 | Fujita | B60W 40/04 |

* cited by examiner

INTEGRATED CHASSIS CONTROL

CROSS-REFERENCE TO RELATED APPLICATIONS

This application claims the benefit of U.S. Provisional Application No. 62/370,351 entitled "Integrated Chassis Control," which was filed on Aug. 3, 2016; this application also claims the benefit of U.S. Provisional Application No. 62/398,758 entitled "Integrated Chassis Control," which was filed on Sep. 23, 2016; this application also claims the benefit of U.S. Provisional Application No. 62/398,788 entitled "Integrated Chassis Control," which was filed on Sep. 23, 2016, each of which are incorporated herein in their entireties by reference.

TECHNICAL FIELD

The application relates generally to vehicle motion control.

BACKGROUND

Electronic stability control systems are intended to detect and reduce loss of directional stability. The electronic stability control system may determine that the vehicle has lost stability based on a deviation of the vehicle's actual measured states from desired states such as deviation of an actual yaw rate of the vehicle from a desired yaw rate. The desired states may be estimated based on driver inputs that imply an intended course for the vehicle, such as steering inputs. Upon determining that the vehicle has lost stability, the electronic stability control system can apply braking at the road wheels individually and/or request propulsion torque to regain stability. For example, braking may be applied to the outer front wheel to counter oversteer or braking may be applied to the inner rear wheel to counter understeer. By minimizing the disparity between the desired chassis yaw rate and the measured chassis yaw rate, the electronic stability control system allows the vehicle to retain some degree of controllability.

SUMMARY

One aspect of the disclosed embodiments is a control system for a vehicle. The control system includes a plurality of vehicle actuators that are operable to affect actual chassis-level accelerations, a vehicle intelligence unit that determines a motion plan, a vehicle motion control unit that receives the motion plan, receives information describing a feasible range of chassis-level accelerations and determines a chassis-level motion request based on the motion plan and the feasible range of chassis-level accelerations, and a chassis control unit that determines actuator commands for the plurality of vehicle actuators based on the chassis-level motion request and controls operation of the plurality of vehicle actuators using the actuator commands.

Another aspect of the disclosed embodiments is a method for controlling a vehicle. The method includes determining a motion plan, determining a chassis-level motion request based on the motion plan and information describing a feasible range of chassis-level accelerations, determining actuator commands for a plurality of vehicle actuators based on the chassis-level motion request, and controlling operation of the plurality of vehicle actuators using the actuator commands.

Another aspect of the disclosed embodiments is a non-transitory computer-readable storage device including program instructions executable by one or more processors that, when executed, cause the one or more processors to perform operations. The operations include determining a motion plan, determining a chassis-level motion request based on the motion plan and information describing a feasible range of chassis-level accelerations, determining actuator commands for a plurality of vehicle actuators based on the chassis-level motion request, and controlling operation of the plurality of vehicle actuators using the actuator commands.

DETAILED DESCRIPTION

The systems and methods described herein allow for centralized coordination of all of the chassis actuators of a vehicle by an integrated chassis control system.

Figure 1:
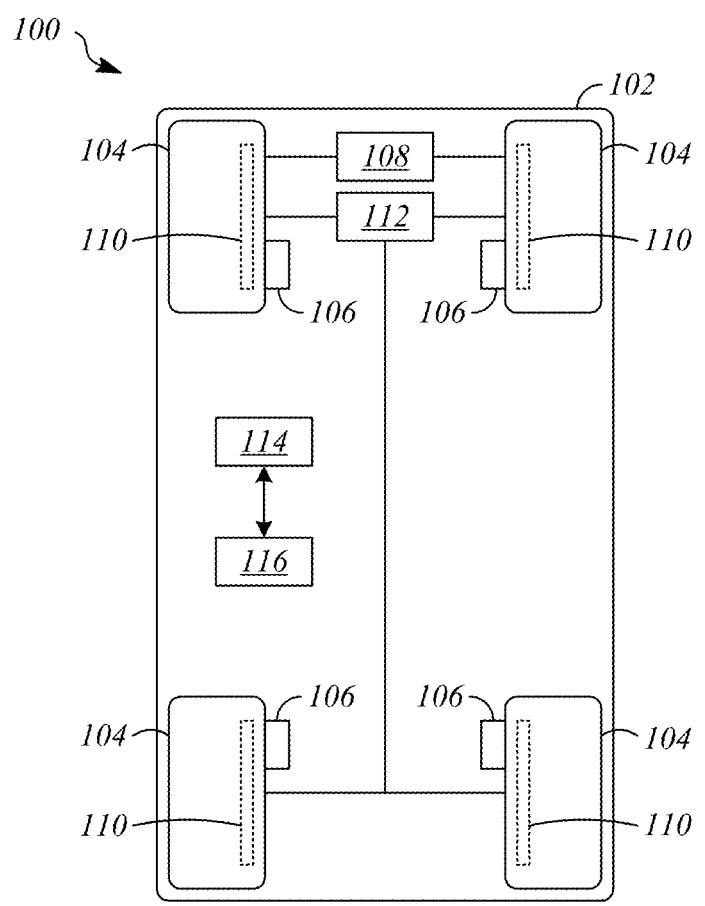
FIG. 1 is an illustration showing a vehicle.

FIG. 1 shows a vehicle 100 that has a vehicle body 102. The vehicle body 102 may include internal structural portions and external portions that are aesthetic and/or structural in nature. As examples, the vehicle body 102 may include one or more of a unibody, a frame, a subframe, a monocoque, and body panels.

The vehicle 100 includes road wheels 104. Four of the road wheels 104 are included in the illustrated example, but other implementations are possible. The road wheels 104 are the portion of the vehicle 100 that contacts the surface on which the vehicle 100 is travelling, and the characteristics of the road wheels 104 are responsible, in part, for the amount of friction available. The road wheels 104 may include tires, such as conventional pneumatic tires formed in part from synthetic rubber, or other friction-enhancing structures may be incorporated in the road wheels 104.

The vehicle 100 includes suspension components 106. The suspension components 106 typically include numerous individual components, many of which are associated with one or more of the road wheels 104. The suspension components 106 may include components that are operable to control characteristics of the motion of the road wheels 104 relative to the vehicle body 102, such as shocks, struts, springs, and sway bars. The suspension components 106 may include either or both of non-adjustable passive components or adjustable active components that allow modification of suspension characteristics during operation of the vehicle 100. The suspension components 106 may include sensors that output signals indicative of the states and operating characteristics of some or all of the suspension components 106 at a given time. The suspension components 106 may also include actuators that are able to cause modification of characteristics of the components of the suspension components 106 in response to control signals.

The vehicle 100 includes steering components 108. The steering components 108 are operable to modify a steering angle of some or all of the road wheels 104 relative to the vehicle body 102. As one example, the steering components 108 may be or include a conventional rack and pinion arrangement. In some implementations, the steering components 108 are operable to control the steering angles of the road wheels 104 independently. The steering components 108 may include one or more sensors to output signals indicative of the steering angles of the road wheels 104. The steering components 108 may include actuators operable to cause adjustment of the steering angles of the road wheels 104 in response to control signals.

The vehicle 100 includes braking components 110. The braking components 110 include components that are operable to slow the speeds of the road wheels 104, such as conventional disk brakes. Other types of components may be utilized to slow the speeds of the road wheels. The braking components 110 also include components that cause and control application of braking forces. These components may include, as examples, a brake control module, a master cylinder, and a brake booster. The braking components 110 are operable to apply braking to each of the road wheels 104 individually. The braking components 110 include sensors that output signals that are indicative of the current operating characteristics of the braking components 110. The braking components 110 may also include actuators that are operable to cause and control application of braking forces in response to control signals.

The vehicle 100 includes propulsion components 112, which may also be referred to as a powertrain. The propulsion components 112 include a prime mover that is operable to convert stored energy into driving force, and components that are operable to supply this force to some or all of the road wheels 104 in order to propel the vehicle 100. As one example, the propulsion components 112 may include an internal combustion engine that burns liquid fuel. As another example, the propulsion components 112 may include an electric motor, batteries and a generator, wherein the electric motor utilizes electrical energy that is stored in the batteries or supplied by the generator.

The vehicle 100 includes a vehicle controller 114. As an example, the vehicle control unit may be an electronic control unit (ECU). Although the vehicle controller 114 is shown as a single unit, the same functions may be implemented using multiple vehicle controllers, such as individual vehicle controllers associated with each of the various components of the vehicle 100. The vehicle controller 114 may be in electrical communication with components including the suspension components 106, the steering components 108, the braking components 110, and the propulsion components 112 to transmit commands to the components and/or to receive information from the components. The vehicle controller 114 may include a memory and a processor that is operable to execute instructions that are stored in the memory in order to perform operations as will be described herein.

The vehicle 100 also includes sensors 116 that are in communication with the vehicle controller 114. The sensors 116 monitor and report information regarding operating characteristics of the vehicle 100. Some of the sensors 116 may be incorporated in the suspension components 106, the steering components 108, the braking components 110, and the propulsion components 112.

Figure 2:
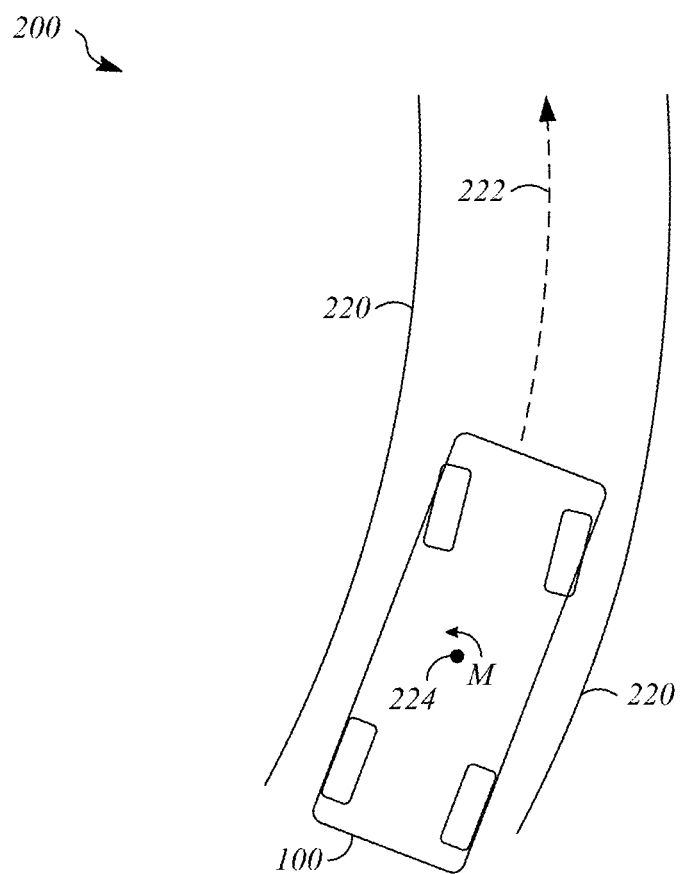
FIG. 2 is an illustration showing the vehicle traversing a roadway.

FIG. 2 shows the vehicle 100 traversing a roadway 200. The roadway 200 includes boundaries 220. As examples, the boundaries 220 could be physical boundaries such as an edge of pavement or a barrier such as a curb, or the boundaries 220 could be marked boundaries such as pavement marking lines that indicate the extents of a lane.

A path 222 represents the intended direction and speed of travel for the vehicle 100. The path 222 may be defined by waypoints, or may be represented mathematically. A yaw moment M represents a moment acting on the vehicle 100 at a center of rotation 224, to cause rotation of the vehicle 100.

Figure 3:
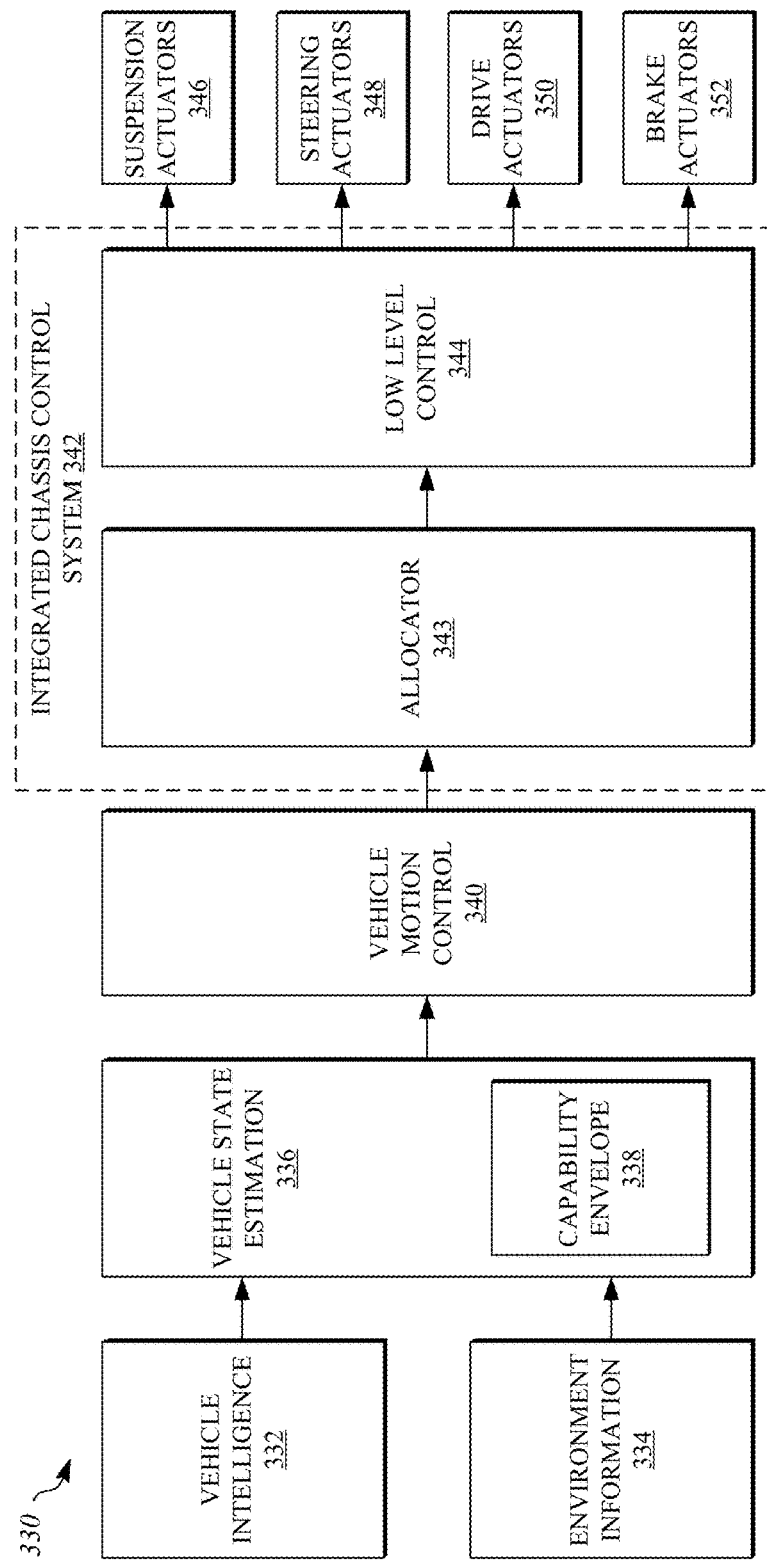
FIG. 3 is an illustration showing a vehicle control system.

FIG. 3 shows a vehicle control system 330 that may be implemented in the vehicle 100. The units and functions of the integrated control system 300 may be implemented using one or more controllers, each having a memory and a processor that is operable to execute instructions that are stored in the memory, such as the vehicle controller 114.

The vehicle control system 330 may include a vehicle intelligence unit 332, environment information 334, a vehicle state estimation unit 336, a capability envelope 338, a vehicle motion control unit 340, an integrated chassis control system 342 that includes an allocator 343 and a low-level control unit 344, suspension actuators 346, steering actuators 348, drive actuators 350 (also referred to herein as propulsion actuators), and brake actuators 352. The vehicle intelligence unit 332, the vehicle state estimation unit 336, the vehicle motion control unit 340, and the low-level control unit 344 may be computing units that are implemented by providing instructions to computing devices, such as the vehicle controller 114 or similarly configured devices.

The vehicle intelligence unit 332 determines a motion plan for the vehicle 100. The motion plan may describe an intended direction of travel and an intended speed of travel for the vehicle 100, and may correspond to the path 222 of FIG. 2.

The motion plan may be determined based on, for example, an intended destination, navigation information that describes a route to the intended destination, traffic information, lane use information, information received from the sensors 116 of FIG. 1 describing conditions outside of the vehicle 100, and other types of information. In some embodiments, the motion plan may include a series of waypoints with associated velocities, accelerations, headings, and/or other information. In some embodiments, the motion plan may in the form of a mathematical description of a path, such as segments, arcs, splines, clothoids, etc.

The environment information 334 may describe conditions in the area surrounding the vehicle 100. The environment information 334 may be received, for example, from the sensors 116 of FIG. 1, or from external systems such as remote information sources accessed over a network connection or from other vehicles in the vicinity of the vehicle 100. The environment information may describe, as examples, roadway surface conditions, horizontal curvature, vertical curvature, superelevation rates, road surface conditions, weather conditions, lane boundary locations, locations of other vehicles, locations of fixed objects, roadway boundary locations, and geometric conditions adjacent to the roadway. Geometric features adjacent to the roadway may describe features such as a clear zone, a steep embankment, or a forested area.

The vehicle state estimation unit 336 determines vehicle characteristics and properties that affect the capabilities of the vehicle 100. The vehicle state estimation unit 336 may determine quasi-constant vehicle characteristics, such as mass, center of gravity location, and moment of inertia for the vehicle 100. The vehicle state estimation unit 336 may also estimate tire properties, such as stiffness, inflation pressure, and road surface conditions, both instantaneous and ahead of the vehicle 100.

The vehicle state estimation unit 336 may also estimate states and characteristics of the propulsion components 112 of the vehicle 100, such as the electric motor and batteries. As examples, the vehicle state estimation unit 336 may determine how much battery power is available, how much generated power could be utilized (e.g., during regenerative braking), how much torque each of the electric motors could produce, and, in cases where there are multiple electric motors, how best to divide torque in order to maximize efficiency and/or avoid overheating one or more of the propulsion components 112. The vehicle state estimation unit 336 may also be responsible for estimating the power requirements for travelling along a planned route and providing this estimate to a battery management system.

The vehicle state estimation unit 336 uses the estimated and determined states and conditions to generate the capability envelope 338. The capability envelope 338 describes limitations of chassis motion, optionally with both spatial and temporal variations, and may be provided to the vehicle motion control unit 340 to provide information regarding the dynamic capabilities of the vehicle 100 in real time given the current states of the vehicle 100 and the environment in which the vehicle 100 is operating, in order to allow the vehicle motion control unit 340 to utilize the full capabilities of the vehicle 100. In particular, the capability envelope 338 represents the ability of components of the vehicle 100, such as the road wheels 104, the suspension components 106, the steering components 108, the braking components 110, and the propulsion components 112, to cause acceleration of the vehicle body 102 in certain directions and magnitudes. These limits may be expressed as the maximum feasible acceleration in each direction, and may be visualized as an envelope that plots the feasible accelerations in their respective directions.

The capability envelope 338 may be provided to the vehicle motion control unit 340 as an input for use in vehicle motion control and chassis control. The capability envelope 338 may also be provided to the vehicle intelligence unit 332 for use in motion planning by the vehicle intelligence unit 332.

The vehicle motion control unit 340 is configured to cause the vehicle 100 to follow a given trajectory described by the motion plan provided by the vehicle intelligence unit 332 with minimal error within state constraints and input constraints. The vehicle motion control unit 340 receives the motion plan as an input and generates information that describes the desired chassis-level motion, which may be referred to as a reference acceleration. The reference acceleration is chosen by the vehicle motion control unit 340 to cause the vehicle 100 to follow a path described by the motion plan, to cause the vehicle 100 to return to the path if it is not currently on the path, and to otherwise cause the vehicle 100 to stay on the path, except when the vehicle motion controller determines that causing the vehicle 100 to follow the path is not feasible. As examples, the path described by the motion plan may be infeasible as a result of errors in the capability envelope 338, changes to the vehicle 100 (e.g., actuator failure), or changes in the environment (e.g., a wet road that suddenly turns icy). In cases where the motion plan is infeasible, the reference acceleration may be determined such that the vehicle 100 remains controllable, deviations from the motion plan are minimized, and, in some implementations, such that hazardous obstacles or regions are avoided, such as fixed barriers, on-coming or stopped traffic, other vehicles, inclined surfaces, or poorly conditioned surfaces (medians, gravel embankments, etc.).

A number of algorithms can be utilized to implement the vehicle motion control unit 340. Examples of algorithms that can be utilized to implement the vehicle motion control unit 340 include a gain-scheduled LQR algorithm, a feedback linearization algorithm, a tire-force model predictive control algorithms, and model predictive control strategies operating on body-level forces. Examples of specific algorithms will be discussed further herein.

The vehicle motion control unit 340 may determine and output information that describes desired chassis motion. Chassis motion may be described in a number of different ways. Examples of types of chassis motion descriptions include six degree of freedom chassis velocity, six degree of freedom chassis acceleration, six degree of freedom chassis acceleration and curvature, and six degree of freedom chassis acceleration scaled for velocity.

Six degree of freedom chassis velocity describes chassis motion in terms of x-direction velocity, y-direction velocity, z-direction velocity, roll velocity, pitch velocity, and yaw velocity. Describing chassis motion using six degree of freedom chassis velocity expedient because it allows for direct comparison to actual chassis velocities, but it is not ideal for actuator control, because actuators cannot cause instantaneous changes in chassis velocities.

Six degree of freedom chassis acceleration describes chassis motion in terms of x-direction acceleration, y-direction acceleration, z-direction acceleration, roll acceleration, pitch acceleration, and yaw acceleration. Six degree of freedom chassis acceleration is well suited to controlling actuators, but will result in an accumulated velocity error over time unless corrected using closed-loop feedback based on measured vehicle speeds. In addition, while well-suited to normal driving speeds, specific acceleration rates such as yaw acceleration rates and lateral acceleration rates become difficult to achieve as the longitudinal speed of the vehicle 100 approaches zero.

Six degree of freedom chassis acceleration with curvature overspecifies the desired chassis motion by adding a curvature component to six degree of freedom chassis acceleration, as described above. At higher longitudinal speeds, the curvature component may be ignored, while at very low speeds (including stopped) the curvature component is the dominant description of how to steer the vehicle 100, with lateral and yaw accelerations becoming increasingly irrelevant as longitudinal speed of the vehicle 100 approaches zero.

Six degree of freedom chassis acceleration scaled for velocity describes chassis motion in terms of x-direction acceleration, y-direction acceleration, z-direction acceleration, roll acceleration, pitch acceleration, and yaw acceleration, but with the lateral acceleration and yaw acceleration normalized by the current longitudinal velocity of the vehicle 100. This approach avoids problems attendant to controlling the vehicle 100 using only six degree of freedom chassis acceleration as the longitudinal speed of the vehicle 100 approaches zero.

The integrated chassis control system 342 includes the allocator 343 and the low-level control unit 344, and coordinates actuator effort across all of the available actuators, such as steering, suspension, powertrain, braking, and aerodynamic actuators. The integrated chassis control system 342 can control operation of the actuators in a manner that optimizes energy consumption or optimizes maneuverability as appropriate, dependent upon the current state of the vehicle 100. The integrated chassis control system 342 allows for centralized control of the actuators, but at the same time is actuator independent, and can be utilized in conjunction with different types of actuators. The integrated chassis control system 342 is also fault tolerant. As an example, the integrated chassis control system 342 may optimize a control strategy to compensate for a fault present in a single actuator by leveraging the capabilities of other actuators.

The integrated chassis control system 342 may also incorporate vehicle stability control algorithms that information regarding the surroundings of the vehicle 100 while controlling vehicle motion at the limits of handling. These algorithms may, under certain circumstances, prioritize vehicle response in terms of safety, such as to facilitate collision avoidance or rollover prevention. As an example these algorithms could execute logic such as: follow the desired path if possible; if not, avoid leaving the lane, if possible; if not, avoid collisions with other traffic and fixed obstacles, avoid departing the roadway, avoid crossing oncoming lanes, prioritized by the apparent safety risk associated with each. For example, the vehicle control system may assign priority to avoiding departure from the roadway based on conditions of the adjacent land, and avoiding departure onto a flat, empty field could be assigned a lower priority than avoiding departure into a forested area. In the context of an autonomous vehicle, detailed information describing the surroundings of the vehicle 100 will be available, and the integrated chassis control system 342 allows this information to be utilized in the vehicle stability control algorithms.

The allocator 343 receives information from the vehicle motion control unit 340 that describes the desired chassis motion for the vehicle 100. Because the desired chassis motion for the vehicle 100 is determined by the vehicle motion control unit 340 such that it satisfies the constraints described by the capability envelope 338, the desired chassis motion can be accomplished by controlling one or more of the actuators in a certain manner. However, the combined operation of the actuators may provide several alternative ways of achieving the desired chassis motion. The allocator 343 may determine and compare a plurality of different control strategies that combine operation of the actuators in different ways to achieve the desired chassis motion. When several different control strategies are equally able to achieve the desired chassis motion, the allocator 343 may utilize additional factors to determine which control strategy to choose. As examples, the allocator 343 may consider factors such as preventing actuator saturation and minimizing energy consumption when selecting a control strategy.

As outputs, the allocator 343 may output information that describes desired states for each of the actuators. As examples, the allocator 343 may output stiffness values for the suspension actuators 346, the allocator 343 may output per-wheel steering angles for the steering actuators 348, the allocator 343 may output desired per-wheel acceleration rates for the drive actuators 350, and the allocator 343 may output per-wheel deceleration rates for the brake actuators 352.

In some embodiments, the functions of the vehicle motion control unit 340 and the allocator 343 are combined, such as in a single optimization algorithm. In such an embodiment, an intermediate description of desired chassis motion is not needed, because chassis-level optimization will be combined with tire-level optimization, and actuator commands will be generated directly.

The low-level control unit 344 provides appropriate control signals to the actuators based on the outputs produced by the allocator 343. The low-level control unit 344 receives outputs from the allocator 343, which may not be in a form that can be used directly by the actuators. As an example, the allocator 343 may determine desired brake rotor torques, but this information is not directly usable by the brake actuators 352. To convert these inputs into usable control signals the low-level control unit 344 utilizes information that defines a relationship between the outputs produced by the allocator 343 and the inputs required by the actuators.

In some embodiments, the low-level control unit 344 may utilize algorithms that provide an appropriate mapping between the outputs from the allocator 343 and the input signals that are expected by the various actuators. In the case of the brake actuators 352, the low-level control unit 344 may convert the desired brake rotor torques into control signals that specify boost pressure and hydraulic pressure for each of the brake calipers of the brake actuators 352, and this conversion may be based in part on characteristics and state information for the various systems of the vehicle 100, such as, in the case of the brake actuators 352, piston area, a model of rotor heating and brake fade, and brake controller hydraulic valve dynamics. As another example, to generate a control signal for the steering actuators 348, the low-level control unit 344 may receive an output from the allocator 343 that requests a particular steering angle at each of the road wheels 104. The low-level control unit 344 converts the desired steering angles to appropriate command signals for the steering actuators 348, such as actuator torques for forces, based on, for example, current steering angles, a current vehicle state, and a low-order model of tire dynamics and suspension kinematics.

In some embodiments, longitudinal tire slip control, wheel angle control, wheel speed control, longitudinal tire force control, lateral tire force control, and suspension force control functions are performed by the allocator 343.

Operation of the integrated chassis control system 342 including the allocator 343 and the low-level control unit 344 will be further explained with reference to FIGS. 4-7.

Figure 4:
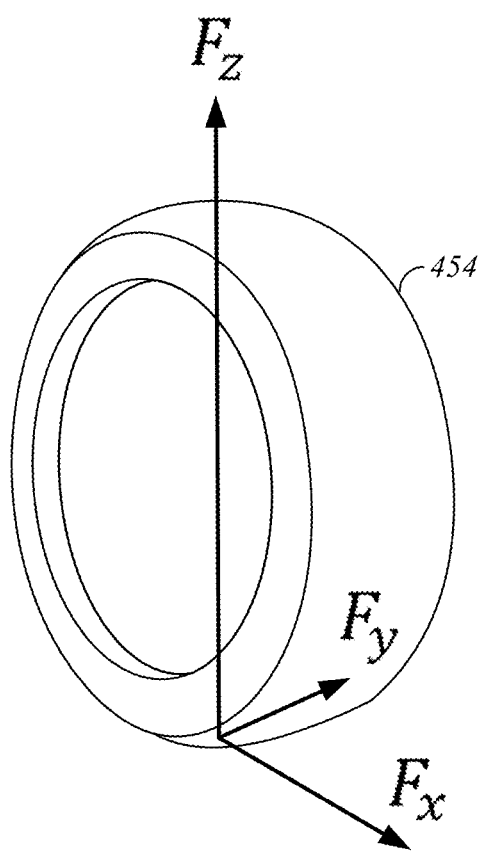
FIG. 4 is an illustration showing forces acting on a tire.

FIG. 4 is an illustration showing forces acting on a tire 454. The forces acting on the tire 454 include a longitudinal tire force F, a lateral tire force $F_y$, and a vertical tire force F. The longitudinal tire force F extends in a plane that is perpendicular to the axis of rotation of the tire 454 in the rolling direction of the tire 454 and corresponds to the direction of motion of the tire 454 under normal operating conditions and stable control of the vehicle 100. The lateral tire force $F_x$ extends perpendicular to the axis of rotation of the tire 454. The vertical tire force $F_z$ extends in a plane that is perpendicular to the axis of rotation of the tire 454, extends perpendicular to the direction of the longitudinal tire force $F_x$, and extends generally perpendicular to the surface supports the tire 454.

Figure 5:
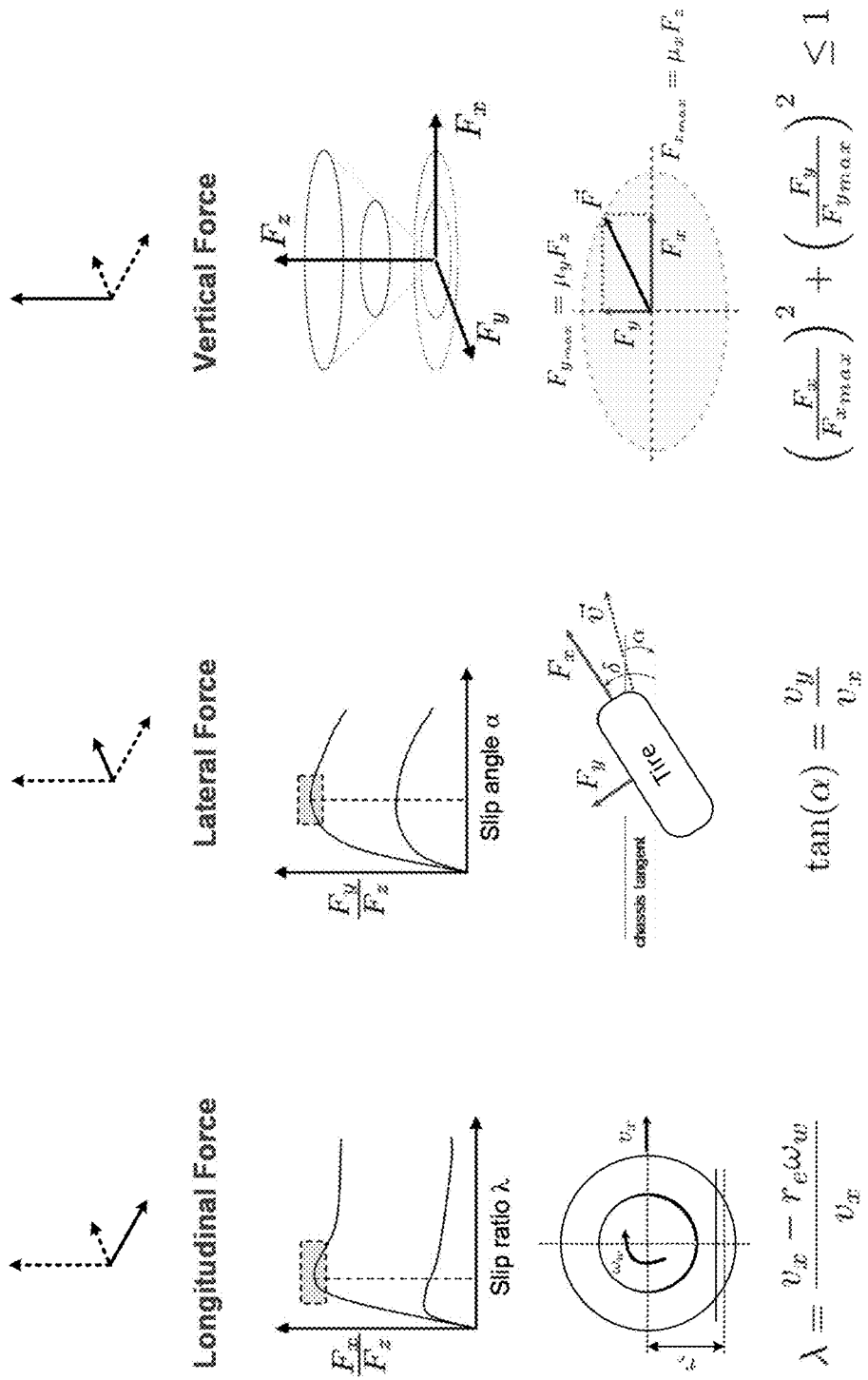
FIG. 5 is an illustration describing longitudinal force, lateral force, and vertical force acting on a tire.

FIG. 5 is an illustration describing the tire longitudinal force $F_x$, the tire lateral force $F_y$, and the tire vertical force F. The tire longitudinal force $F_x$ is related to wheel slip $\lambda$, as shown in Equation 1:

$$\lambda = \frac{v_x - r_e w_w}{v_x} \quad \text{(Equation 1)}$$

In Equation 1, $v_x$ is the longitudinal speed of the center of the tire, re is the effective radius of the tire, and $w_w$ is the angular speed of the tire.

The tire lateral force $F_y$, is related to the slip angle $\alpha$, as shown in Equation 2:

$$\tan\alpha = \frac{v_y}{v_x} \quad \text{(Equation 2)}$$

In Equation 2, $v_x$ is the longitudinal speed of the center of the tire and $v_y$ is the lateral speed of the center of the tire.

The tire vertical force $F_z$ limits the maximum tire longitudinal force $F_x$, the tire lateral force $F_y$ in accordance with available friction per Equations 3 through 5:

$$F_{x_{max}} = \mu_x F_z \quad \text{(Equation 3)}$$

$$F_{y_{max}} = \mu_y F_z \quad \text{(Equation 4)}$$

$$\left(\frac{F_x}{F_{x_{max}}}\right)^2 + \left(\frac{F_y}{F_{y_{max}}}\right)^2 \leq 1 \quad \text{(Equation 5)}$$

Figure 6:
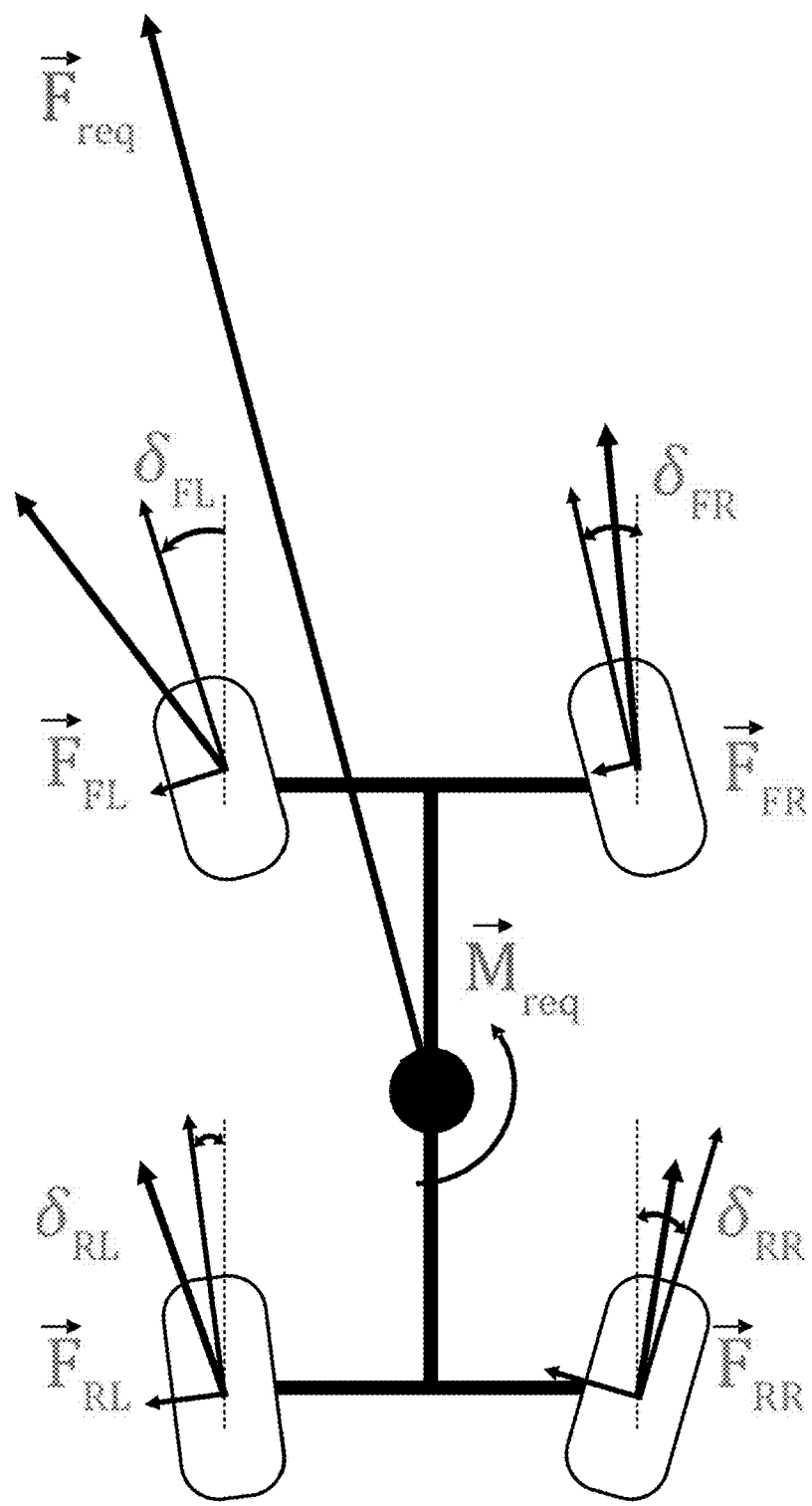
FIG. 6 is an illustration showing a relationship between requested forces and moments and allocated tire forces and angles.

FIG. 6 is an illustration showing forces acting on the vehicle 100. $\vec{F}_{req}$ and $\vec{M}_{req}$ represent the chassis motion requested by the vehicle motion control unit 340, expressed here as force and motion vectors in six degrees of freedom. In FIG. 6, $\delta_{FL}$, $\delta_{FR}$, $\delta_{RL}$, and $\delta_{RR}$ represent the angles, determined by the allocator 343 in response to the requested chassis motion, relative to the chassis tangent for each of the front left, front right, rear left, and rear right tires of the vehicle 100, and $\vec{F}_{FL}$, $\vec{F}_{FR}$, $\vec{F}_{RL}$, and $\vec{F}_{RR}$ represent the tire forces for each of the front left, front right, rear left, and rear right tires of the vehicle 100.

The allocator 343 may determine the angles and forces for each of the tires by minimizing a difference between desired chassis motion $F_{des}$ and feasible chassis motion $F_{feas}$, which may be represented by the capability envelope 338. This may be expressed as an optimization problem in the form shown in Equation 6:

$$\min_{F_{feas}, F_{des}} \|F_{feas} - F_{des}\|, \text{ subject to:} \quad \text{(Equation 6)}$$

$$F_{feas} \in \mathcal{C} \quad \text{(Equation 7)}$$

$$F_{feas} \in \mathcal{R} \quad \text{(Equation 8)}$$

In Equation 7, $\mathcal{C}$ represents the force distribution actuator limits. In Equation 8, 1 represents tire force states for the individual tires that, in combination, corresponding to the desired state as per Equations 9-11:

$$F_i = \begin{bmatrix} F_i^x \\ F_i^y \\ F_i^z \end{bmatrix} \quad \text{(Equation 9)}$$

$$\sum_{i \in \{FL, FR, RL, RR\}} \vec{F}_l = \vec{F}_{req} \quad \text{(Equation 10)}$$

$$\sum_{i \in \{FL, FR, RL, RR\}} \vec{k}_l \times \vec{F}_l = \vec{M}_{req} \quad \text{(Equation 11)}$$

Subject to the friction ellipse, tire lateral forces, and longitudinal tire forces, the optimization performed by the allocator 443 may be stated as shown in Equations 12-18:

$$\min_{F_{feas}, F_{des}, s_m, s_f} \|F_{feas} - F_{des}\|_2^2 + \|S_f\|_{Q_f} + q_m s_m, \text{ subject to:} \quad \text{(Equation 12)}$$

$$M_m F_{des} = M_{req} + s_m \quad \text{(Equation 13)}$$

$$M_m F_{des} = M_{req} + s_f \quad \text{(Equation 14)}$$

$$\|F_i\|_Q \leq F_{max}, i \in \{FL, FR, RL, RR\} \quad \text{(Equation 15)}$$

$$F_{feas}^y = C_y[\delta - \tan^{-1}(v_y - v_x)] \quad \text{(Equation 16)}$$

$$F_{feas}^x = C_x \lambda_x \quad \text{(Equation 17)}$$

$$s_f, s_m \leq 0 \quad \text{(Equation 18)}$$

Figure 7:
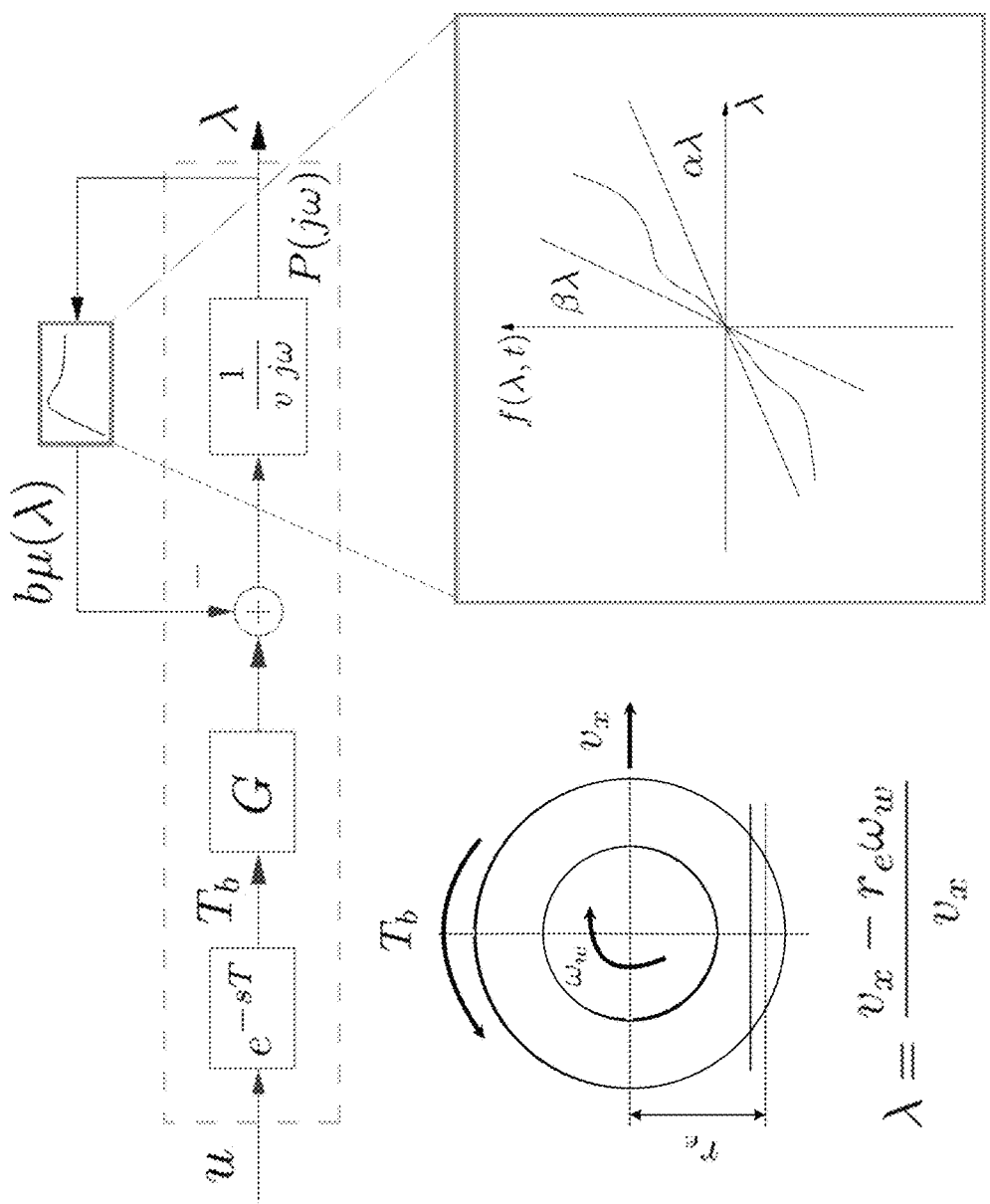
FIG. 7 is an illustration showing tire slip control.

FIG. 7 is an illustration showing tire slip control that may by implemented by the low-level control unit 344. The tire slip control may be performed by the low-level control unit 344 according to the optimization problem described below in Equations 19-22:

$$\min_{C(jw)} \|S(jw)\|_\infty, \text{ subject to:} \quad \text{(Equation 19)}$$

$$\text{Re}\{(1 + \beta P(jw)C(jw))(1 + \beta P(jw)C(jw))^{-1}\} > 0 \quad \text{(Equation 20)}$$

$$S(jw) = (1 + P(jw))^{-1} \quad \text{(Equation 21)}$$

$$\omega > 0 \quad \text{(Equation 22)}$$

The tire slip control described in Equations 19-22 minimizes the sensitivity function S of the closed loop system by finding the controller C by imposing robust stability for the friction curve. The optimization problem is solved in controller parameter space.

Figure 8:
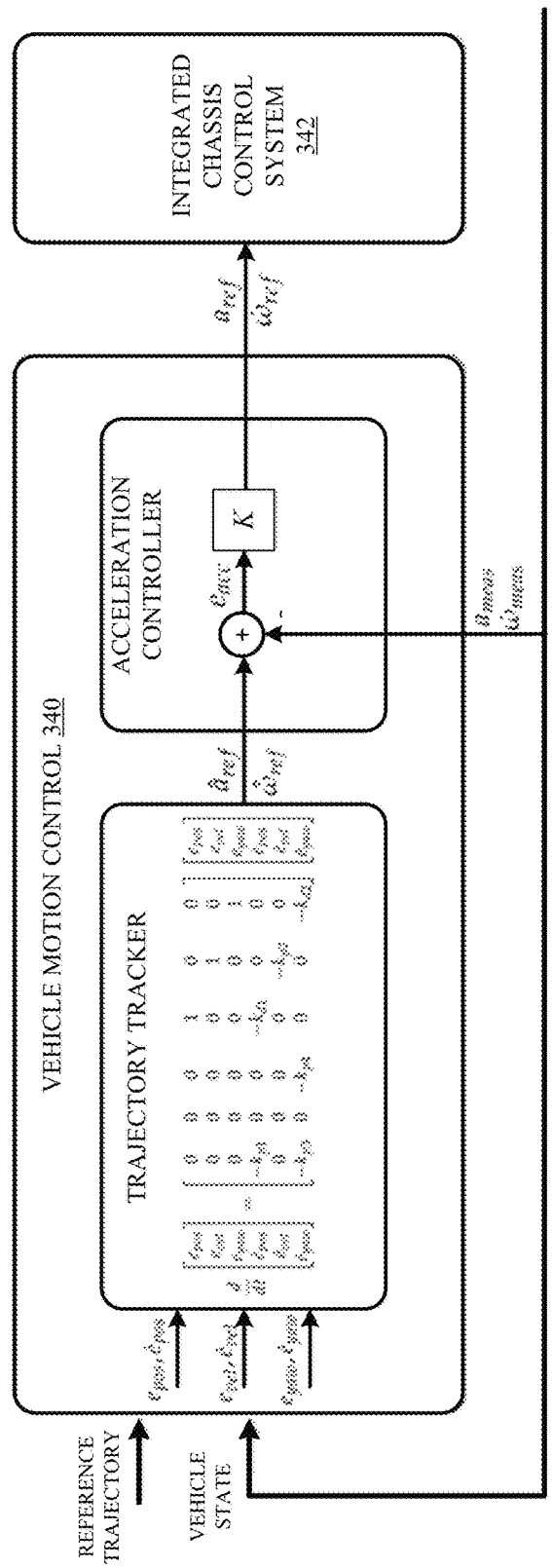
FIG. 8 is an illustration showing a reference trajectory tracking method.

FIG. 8 is an illustration showing a reference trajectory tracking method that may be implemented by the vehicle motion control unit 340. The vehicle motion control unit 340 receives the reference trajectory from, for example, the vehicle intelligence unit 332. The vehicle motion control unit 340 also receives information regarding current states of the vehicle 100. The feedback provided by comparing the reference trajectory and the current states is utilized to adjust the description of requested chassis motion that is output by the vehicle motion control unit 340 and received by the integrated chassis control system 342.

Vehicle Motion Control Example 1: Suboptimal Linear Quadratic Regulator (LQR) with Pole Placement and Model Predictive Control (MPC)

One model that can be utilized by the vehicle motion control unit 340 is referred to herein as suboptimal LQR with pole placement and MPC. This model includes six states: cross track error $e_y$, heading error $e_\psi$, vehicle lateral velocity $v_y$, yaw rate $r$, trajectory reference curvature $\kappa$, trajectory reference strafing angle $\alpha$, front steering angle $\delta_f$, and rear steering angle $\delta_r$.

Let $x=[e_y, e_\psi, v_y, r, \kappa, \alpha]^T$ and let $u=[\delta_f, \delta_r]^T$. The linearized continuous-time system dynamics ($\dot{x}=Ax+Bu$) are given by Equation 23 and Equation 24:

$$A = \begin{bmatrix} 0 & v_x & 1 & 0 & 0 & v_x \\ 0 & 0 & 0 & 1 & -v_x & 0 \\ 0 & 0 & -\frac{C_f+c_r}{mv_x} & -\frac{aC_f-bC_r}{mv_x} & 0 & 0 \\ 0 & 0 & -\frac{aC_f-bC_r}{I_z v_x} & -\frac{a^2 C_f+b^2 C_r}{I_z v_x} & 0 & 0 \\ 0 & 0 & 0 & 0 & 0 & 0 \\ 0 & 0 & 0 & 0 & 0 & 0 \end{bmatrix} \quad \text{(Equation 23)}$$

$$B = \begin{bmatrix} 0 & 0 \\ 0 & 0 \\ \frac{C_r}{m} & \frac{C_r}{m} \\ \frac{aC_f}{I_z} & \frac{bC_r}{I_z} \\ 0 & 0 \\ 0 & 0 \end{bmatrix} \quad \text{(Equation 24)}$$

Where $v_x$ is the longitudinal vehicle velocity, $C_f$ and $C_r$ are the longitudinal and lateral tire stiffness, respectively, $m$ is the vehicle mass, $I_z$ is the moment of inertia around the z-axis, $a$ and $b$ are the distances of the center of gravity from the front and rear axles, respectively.

For the longitudinal dynamics an integrator state is added along with the longitudinal velocity, and the final model is given by the state $x=[e, v_x]^T$, control input $u=a_x$, and reference $r=v_x^{ref}$ with continuous-time system dynamics ($\dot{x}=A_x+B_u u+B_r r$) given by Equations 25-27:

$$A = \begin{bmatrix} 0 & -1 \\ 0 & 0 \end{bmatrix}^T \quad \text{(Equation 25)}$$

$$B_u = [0 \; 1]^T \quad \text{(Equation 26)}$$

$$B_r = [1 \; 0]^T \quad \text{(Equation 27)}$$

The system constraints have the objective of enforcing a simplified capability envelope that consists of actuation limits and maximum accelerations. The actuation limits are defined by the following inequalities shown in Equations 28-30:

$$-\delta_f^{max} \leq \delta_f \leq \delta_f^{max} \quad \text{(Equation 28)}$$

$$-\delta_r^{max} \leq \delta_r \leq \delta_r^{max} \quad \text{(Equation 29)}$$

$$a_x^{min} \leq a_x \leq a_x^{max} \quad \text{(Equation 30)}$$

Where $a_x^{max}$ is given by the powertrain, $a_x^{min}$ is given by the brakes, and $\delta_f^{max}$ is given by the mechanical limits of the steering system.

The maximum acceleration constraint is given by Equation 31:

$$a_x^2+a_y^2 \leq \mu g \quad \text{(Equation 31)}$$

Where $\mu$ is the friction coefficient, g is the local gravity constant, and $a_y$ is given by Equation 32:

$$a_y = \dot{v}_y+v_x r = A^{(3)}x+B^{(3)}u+v_x r \quad \text{(Equation 32)}$$

Where $A^{(i)}$ and $B^{(i)}$ are the i-th line of matrices A (Equation 23) and B (Equation 24), respectively.

Pole placed LQR design includes a linear matrix inequality (LMI) based solution to the infinite horizon LQR. The solution to the infinite horizon discrete-time LQR is given by Equation 33:

$$P=A^T PA+A^T PB(R+B^T PB)^{-1}B^T PA+Q \quad \text{(Equation 33)}$$

Equation 11 is equivalent to Equations 34 and 35:

$$P=(A-BK)^T P(A-BK)+Q+K^T RK \quad \text{(Equation 34)}$$

$$K=(R=B^T PB)^{-1}B^T PA \quad \text{(Equation 35)}$$

A relaxation of this solution can be used to define an equivalent Semi-Definite Programming (SDP) problem, given by Equation 36:

$$\min_{W,n} -tr(W) \quad \text{(Equation 36)}$$

$$s.t. \begin{bmatrix} -Q^{-1} & 0 & 0 & W \\ * & -R^{-1} & 0 & N \\ * & * & -W & AW-BN \\ * & * & * & -W \end{bmatrix} \leq 0$$

$$W \geq 0$$

In Equation 36, $W=P^{-1}$ and $N=KP^{-1}$.

In a closed loop system given by $A_c=A-BK$, the location of the eigenvalues of $A_c$ can be constrained to a region in the complex plane per Equation 37 by guaranteeing that:

$$L+M \otimes A_c+A_c^T \otimes M^T - 0 \quad \text{(Equation 37)}$$

In Equation 15, $\otimes$ is the Kronecker product. Since the decision variable in the previous problem is W and N instead of W and $W \geq 0$ by definition, we can perform a right hand multiplication by W resulting in Equation 38:

$$L \otimes W+M \otimes (AW-BN)+(AW-BN)_T \otimes M^T \leq 0 \quad \text{(Equation 38)}$$

Where L and M define the shape complex region. As an example of L and M, as shown in Equation 39, for the left plane at $\alpha$: $Re(\lambda(A_c)) \leq \alpha$:

$$L=-2\alpha, M=1 \quad \text{(Equation 39)}$$

As another example of L and M, as shown in Equation 40, for the right plane at $\alpha$: $Re(\lambda(A_c)) \leq \alpha$:

$$L=2\alpha, M=-1 \quad \text{(Equation 40)}$$

As another example of L and M, as shown in Equation 41, for a disk constraint with radius r and center c: $\|(A_c)-c\| \geq r$:

$$L=\begin{bmatrix} -r & -c \\ -c & -r \end{bmatrix}, M=\begin{bmatrix} 0 & 1 \\ 0 & 0 \end{bmatrix} \quad \text{(Equation 41)}$$

As another example of L and M, as shown in Equation 42, for a conic constraint with angle $\theta$ and apex $\alpha$:

$$L=-2\alpha I, M=\begin{bmatrix} \sin\theta & \cos\theta \\ -\cos\theta & \sin\theta \end{bmatrix} \quad \text{(Equation 42)}$$

Per the foregoing, the control algorithm executed by the vehicle motion control unit 340 may be designed with an objective of all closed loop poles having a damping factor $\zeta \geq 0.9$ and a natural frequency $\omega \leq 8$ Hz. This region was approximated using two conic constraints and a right half plane constraint. Subsequently the cost and gain matrices were calculated from 3 m/s to 30 m/s.

The algorithm described above may be refined by adopting a pre-stabilized model predictive control (MPC) design. The LMI-based solution to the infinite horizon LQR subject to pole placement constraints yields a suboptimal solution to the LQR problem, therefore the nominal MPC behavior (when no constraints are active) would not be the same as described above. To address this, the MPC is reformulated as a suboptimal MPC (SO-MPC). Given the standard MPC problem shown in Equation 43:

$$J(x_o) = \min_u x_N^T P_N x_N + \sum_{k=0}^{N-1} x_k^T Q x_k + u_k^T R u_k \quad \text{(Equation 43)}$$

subject to $\frac{x_k + 1 = A x_k + B u_k}{[x_k^T, u_k^T]^T \in C_k}$

Let $u_k^T = K x_k + V_k$ where K is obtained with respect to the LMI-based solution to the infinite horizon LQR, as described above, and $v_k$ is a feasibility offset that ensures feasibility of the solution. Then, the SO-MPC is given as shown in Equation 44:

$$\bar{J}(x_o) = \min_u x_0^T P x_0 + \sum_{k=0}^{N-1} v_k^T (R + B'XB) v_k \quad \text{(Equation 44)}$$

subject to $x_k + 1 = (A - BK) x_k + B v_k$ $[x_k^T, (-K x_k + V_k)^T]^T \in C_k$ Where X is the solution to Equation 45:

$$P = (A-BK)^T X (A-BK) + Q + K^T R K \quad \text{(Equation 45)}$$

And X>P, thus $\bar{J}(x_o) >= J(x_o)$, hence the name sub-optimal MPC.

Per the foregoing, the control algorithm executed by the vehicle motion control unit 340 may be designed using $C_k$ as the acceleration and actuator constraints described above.

Vehicle Motion Control Example 2: Body-Level Model-Predictive Control

One model that can be utilized by the vehicle motion control unit 340 is referred to herein as body-level model-predictive control. In this example, m is vehicle mass, $I_z$ is vehicle moment of inertia about its center of gravity, $F_i$, and $F_{direction,location}$ are actual tire forces, $F_{i,c}$ are commanded tire forces, l, relaxation is a tire relaxation length, and h is the height of the center of gravity of the vehicle 100.

Figure 9:
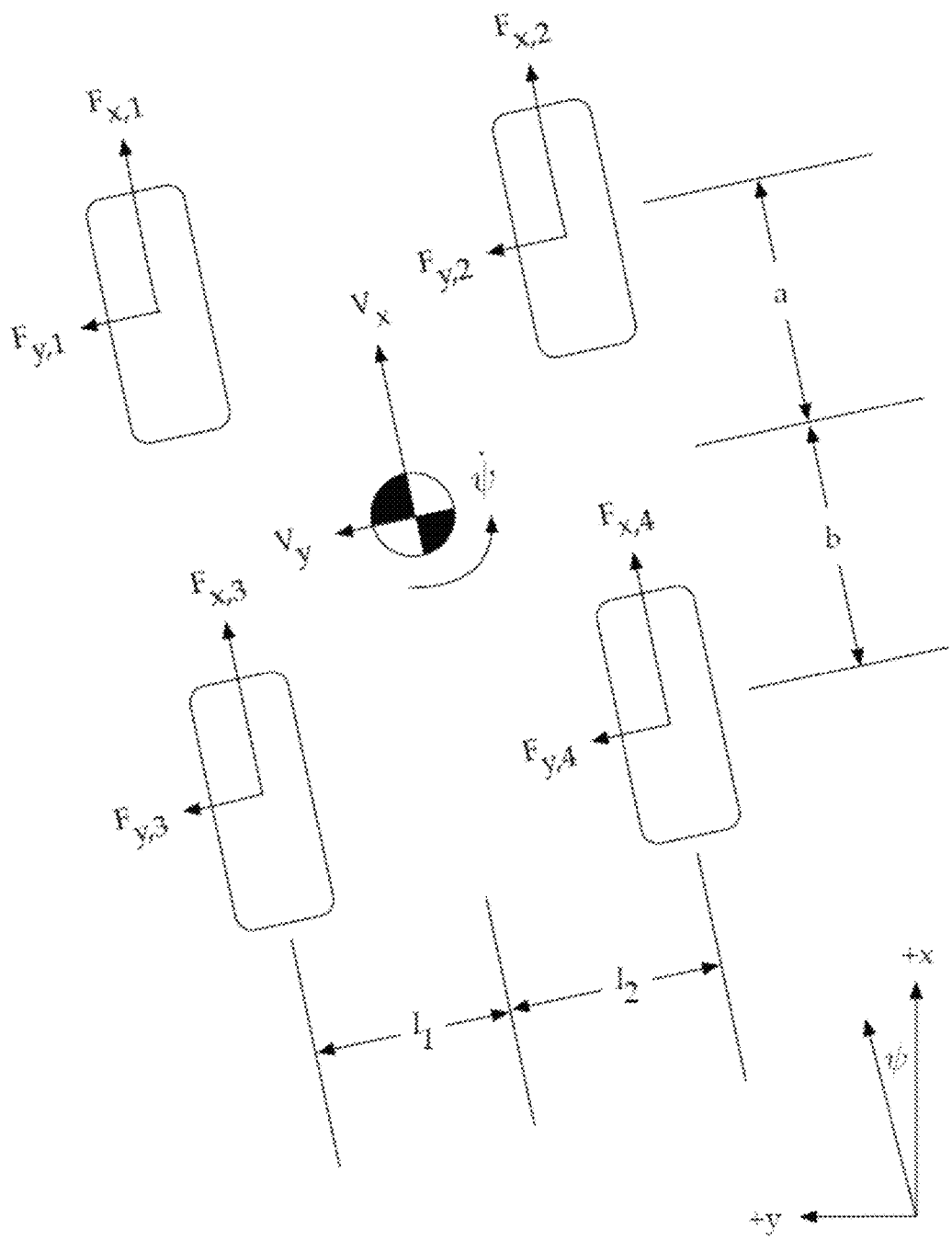
FIG. 9 is an illustration showing a three degree of freedom two-track model.

FIG. 9 shows a three degree of freedom two-track model that may be used to represent the vehicle 100. The states shown in this model are given by Equation 46:

$$f(X) := \frac{d}{dt} \begin{bmatrix} x \\ y \\ v_x \\ v_y \\ \psi \\ \dot{\psi} \end{bmatrix} = \begin{bmatrix} R(\psi) \begin{bmatrix} v_x \\ v_y \end{bmatrix} \\ \frac{1}{m} F_x + v_y \dot{\psi} \\ \frac{1}{m} F_y + v_x \dot{\psi} \\ \dot{\psi} \\ \frac{1}{I_z} M_z \end{bmatrix} \quad \text{(Equation 46)}$$

In Equation 46, $R(\psi)$, $F_x$, $F_x$, and $M_z$ are as shown in Equations 47 and 48:

$$R(\psi) = \begin{bmatrix} \cos(\psi) & -\sin(\psi) \\ \sin(\psi) & \cos(\psi) \end{bmatrix} \quad \text{(Equation 47)}$$

$$\begin{bmatrix} F_x \\ F_y \\ M_z \end{bmatrix} + \begin{bmatrix} 1 & 0 & 1 & 0 & 1 & 0 & 1 & 0 \\ 0 & 1 & 0 & 1 & 0 & 1 & 0 & 1 \\ -l_1 & a & l_2 & a & -l_1 & -b & l_2 & -b \end{bmatrix} \quad \text{(Equation 48)}$$

The tire forces $F_i$ are the vehicle's control inputs. $F_i$ are not generated instantaneously. For a step input in steer angle/slip angle, the force generated at the tire can be approximated with a first order response as shown in Equation 49:

$$\dot{F}_i = \frac{1}{T_i} (F_{i,c} - F_i) \quad \text{(Equation 49)}$$

In Equation 27, Ti is as shown in Equation 50:

$$T_i = \frac{l_{relaxation,i}}{v_x} \quad \text{(Equation 50)}$$

Equations 27 and 28 reflect the fact that tire force is not generated until the wheel rotates new rubber into the contact patch. Under this model, and with the assumption that all tires have equal relaxation lengths for a given direction (longitudinal, lateral), the dynamics are as given in Equation 51:

$$f(X) := \frac{d}{dt} \begin{bmatrix} x \\ y \\ v_x \\ v_y \\ \psi \\ \dot{\psi} \\ F \end{bmatrix} = \begin{bmatrix} R(\psi) \begin{bmatrix} v_x \\ v_y \end{bmatrix} \\ \frac{1}{m} F_x + v_y \dot{\psi} \\ \frac{1}{m} F_y + v_x \dot{\psi} \\ \dot{\psi} \\ \frac{1}{I_z} M_z \\ k_\tau (F - F_c) \end{bmatrix} \quad \text{(Equation 51)}$$

In Equation 51, F is given as shown in Equation 52:

$$F = \begin{bmatrix} F_{x,1} \\ F_{y,1} \\ \dots \\ \dots \end{bmatrix}, F_c = \begin{bmatrix} F_{x,1,cmd} \\ F_{y,1,cmd} \\ \dots \\ \dots \end{bmatrix}, k_\tau = \text{diag}\begin{pmatrix} \begin{bmatrix} \frac{1}{\tau_x} \\ \frac{1}{\tau_y} \\ \frac{1}{\tau_x} \\ \frac{1}{\tau_y} \\ \dots \\ \dots \end{bmatrix} \end{pmatrix}$$ (Equation 52)

In this system, the MPC problem is formulated as a traditional linear time-varying (LTV) MPC problem subject to certain adjustments, as shown in Equations 53-59. Constraints are added for friction availability based on weight transfer and local tire slip. In the embodiment, that only states that utilized as cost factors are the positional errors.

$$\min_{U_1,\dots U_{N-1}} \sum_{k=1}^{N} \left( \left\| \begin{bmatrix} e_{t_k} \\ e_{r_k} \end{bmatrix} \right\|_{Q_{path}} + C_F \|F_k\|_{Q_F} \right)$$ (Equation 53)

subject to $X_{k+1} = \bar{A}_k X_k + \bar{B}_k U_k + \bar{c}_k,$ (Equation 54)
$k = 1, \dots, N-1$ $X_o = X_{init}$ (Equation 55)

$e_{t_k} \le e_{t,k,max}\ k = 1, \dots, N-1$ (Equation 56)

$\left\| \begin{matrix} F_{xi,k} \\ F_{yi,k} \end{matrix} \right\|_{Q_{friction,k}} \le \frac{F_{zi,k}}{F_{zi,nom}},$ (Equation 57)

Figure 10:
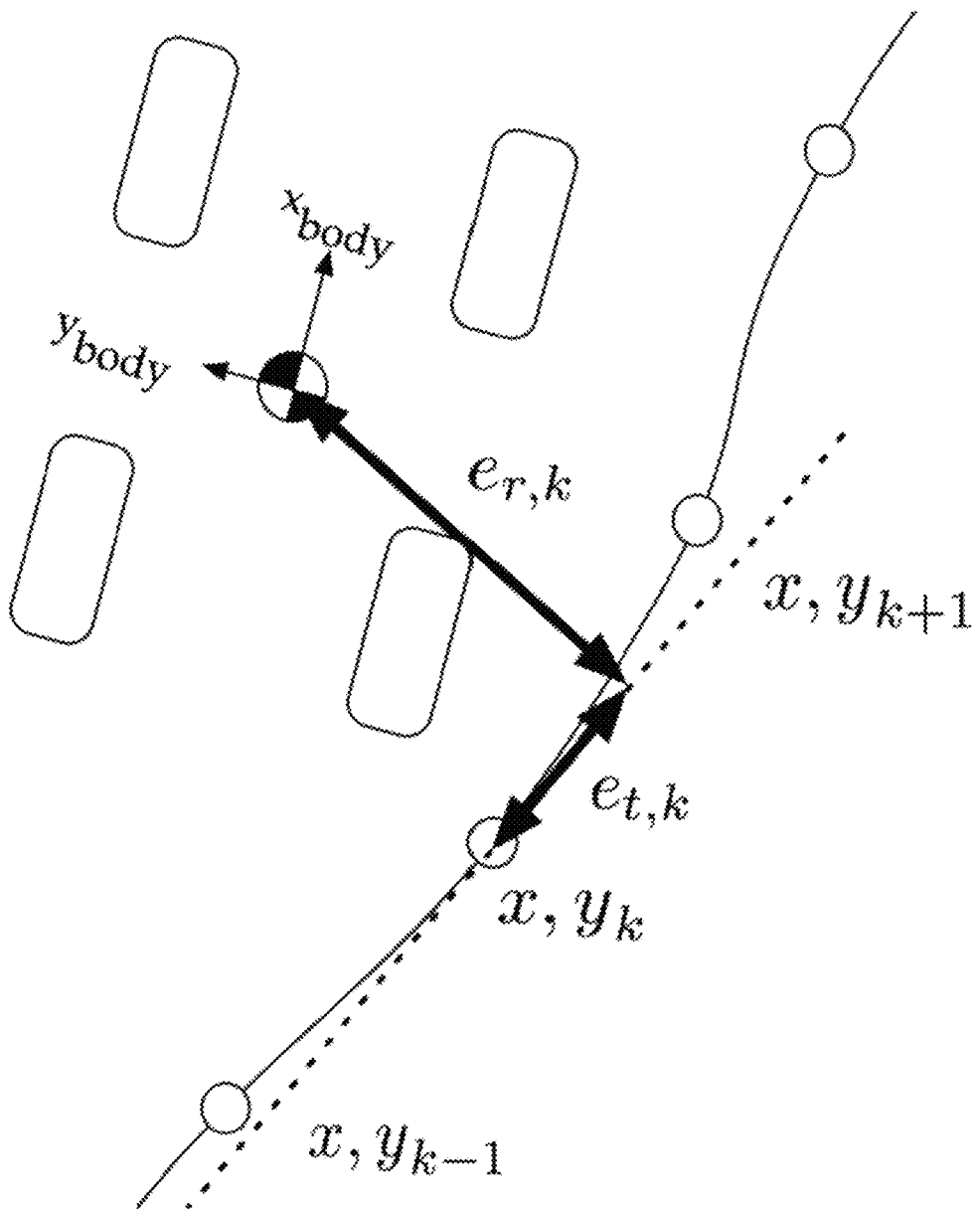
FIG. 10 is an illustration showing tangential and radial error.

$k = 1, \dots, N-1\ i = 1, \dots, n_{tires}$ $\{F_{yi,k}, \check{\alpha}\} \in \mathbb{P}_{i,k},\ k = 1, \dots,$ (Equation 58)
$N-1\ i = 1, \dots, n_{tires}$ $(F_{yi,k+1} - F_{yi,k}) \le \dot{F}_{y\,max}(t_{k+1} - t_k),$ (Equation 59)
$k = 1, \dots, N-1\ i = 1, \dots, n_{tires}$ The path tangential error $e_{t_k}$ (i.e., along-track error) and radial error $e_{r_k}$ (i.e., cross-track error) at each time step k are defined as shown in FIG. 10.

The norm weights shown in Equation 59 are chosen with "nominal" error and force values. Note that, according to this scheme, $e_{t_k} = e_{t,nom}$, $e_{r,k} = e_{r,nom}$, and $F_{i,k} = F_{i,nom}$ all generate equal relative cost.

$$Q_{path} = \begin{bmatrix} \frac{1}{e_{t,nom}^2} & 0 \\ 0 & \frac{1}{e_{r,nom}^2} \end{bmatrix}, Q_F = \text{diag}\begin{pmatrix} \begin{bmatrix} \frac{1}{F_{x,nom}^2} \\ \frac{1}{F_{y,nom}^2} \\ \frac{1}{F_{x,nom}^2} \\ \frac{1}{F_{y,nom}^2} \\ \dots \\ \dots \end{bmatrix} \end{pmatrix}$$ (Equation 60)

The discrete, linear dynamics described in Equation 54 are obtained by linearizing Equation 46 about a series of linearization conditions $\{X_{lin,k}, U_{lin,k}\} \in (\mathbb{R}^{N_x} \times \mathbb{R}^{N_u})$, $k=1, \dots, N-1$ and discretizing with a zero-order hold transformation. An effective choice for $\{X_{lin,k}, U_{lin,k}\}_{current}$ is the MPC trajectory $\{X_k, U_k\}_{last}$ calculated by the previous MPC iteration, linearly interpolating beyond the last relevant point in the trajectory.

The control process described above is subject to a path-varying lateral error constraint, to ensure that the follows the path without exceeding a path-varying lateral error constraint, which may be provided, for example, by the vehicle intelligence unit 332.

In the control process described above, each tire's forces are constrained within the tire friction ellipse, which grows and shrinks with applied normal load. By assuming instantaneous suspension dynamics, we can calculate each tire's normal load as a function of the model's states, and therefore build a realistic knowledge of dynamically available friction forces into the optimization, per Equation 61:

$$F_{z,1} = mg \frac{b - h\frac{\dot{v}_x}{g}}{a+b}$$ (Equation 61)

Vehicle Motion Control Example 3: Stabilizing Trajectory Tracking Control

Another model that can be utilized by the vehicle motion control unit 340 is referred to herein as stabilizing trajectory tracking control. This model is based on an abstract vehicle dynamic model consisting of "point mass" dynamics and heading (yaw) dynamics.

The dynamics of the vehicle 100 may be defined as in Equations 62-64:

$ma_x = m(\dot{u}_x - \dot{\psi}u_y) = F_x^{ref},$ (Equation 62)

$ma_y = m(\dot{u}_y - \dot{\psi}u_y) = F_y^{ref},$ (Equation 63)

$I_z\ddot{\psi} = M_z$ (Equation 64)

Figure 11:
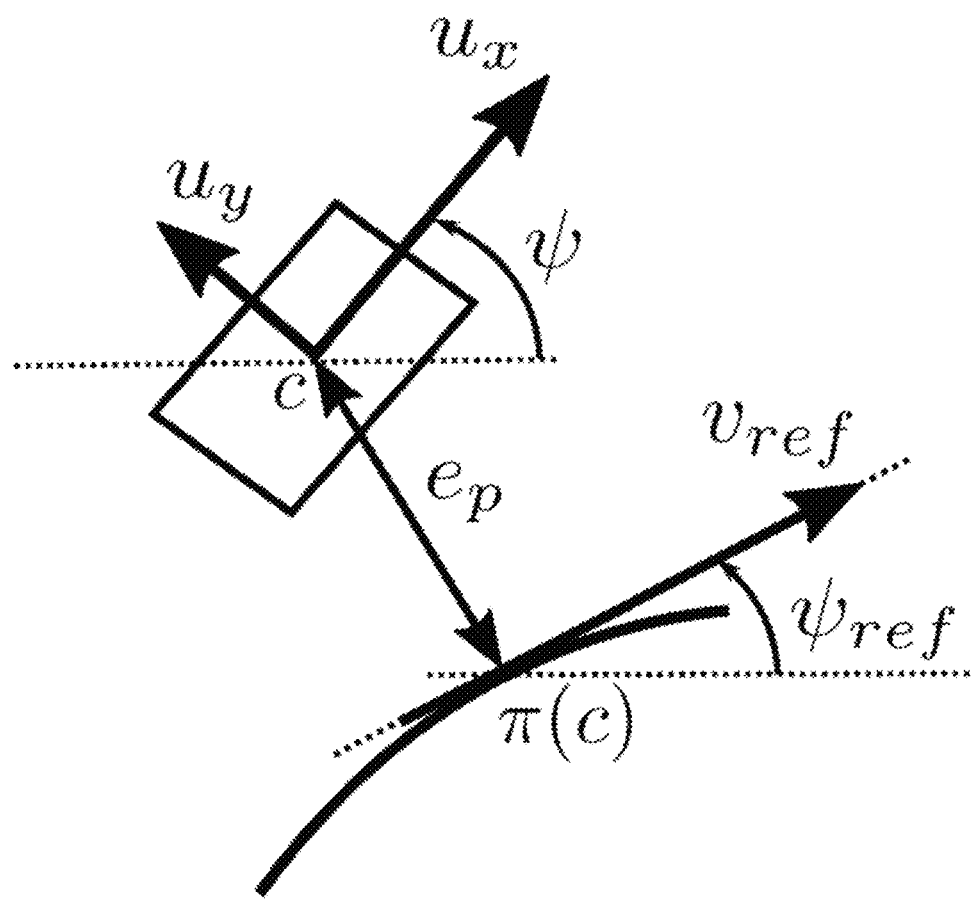
FIG. 11 is an illustration showing trajectory cross-track error.

Trajectory cross-track error $e_p$ is defined as the distance from the trajectory, i.e. the distance of the reference point (c) from its orthogonal projection onto the trajectory $\pi$(c), as shown in FIG. 11.

At any time instance, assuming the stationary orthogonal projection, the time derivative of the cross-track error $e_p$ is given as a projection of the vehicle velocity onto the unit distance vector $(c-\pi(c))/\|c-\pi(c)\|$ transformed into the vehicle coordinate frame, as in Equation 65:

$$\dot{e}_p = [u_x\ u_y] T_{e_\psi} \begin{bmatrix} 0 \\ 1 \end{bmatrix}$$ (Equation 65)

In Equation 65, $T_{e_\psi}$ denotes coordinate transformation matrix from trajectory tangent space to the vehicle frame, as given in Equation 66:

$$T_{e_\psi} := \begin{bmatrix} \cos e_\psi & \sin e_\psi \\ -\sin e_\psi & \cos e_\psi \end{bmatrix}$$ (Equation 66)

In Equation 66, $e_\psi = \psi - \psi_{ref}$ is the yaw (heading) error.

Substituting Equation 66 into Equation 65 and differentiating with respect to time, we obtain the expressions for the cross-track error time derivatives $\dot{e}_p$ and $\ddot{e}_p$ as shown in Equations 67 and 68:

$$\dot{e}_p = u_x \sin e_\psi + u_y \cos e_\psi \quad \text{(Equation 67)}$$

$$\ddot{e}_p = \dot{u}_x \sin e_\psi + u_y(\cos e_\psi + u_x \bar{e}_\psi) \quad \text{(Equation 68)}$$

In a similar way we can define a velocity tracking error e, as shown in Equation 69:

$$e_v = [u_x \ u_y] T_{e_\psi} \begin{bmatrix} 0 \\ 1 \end{bmatrix} - v_{ref} = u_c \sin e_\psi + u_y \cos e_\psi \quad \text{(Equation 69)}$$

The time derivative of the velocity tracking error e, is defined as shown in Equation 70:

$$\dot{e}_v = \dot{u}_x \cos e_\psi - \dot{u}_y \sin e_\psi - \dot{e}_\psi(u_x \sin e_\psi + u_y \cos e_\psi) - \dot{v}_{ref} \quad \text{(Equation 70)}$$

Based on the dependence of $\ddot{u}_x$ and $\ddot{u}_y$ on acceleration vector components and vehicle yaw rate, Equations 71 and 72 may be derived from Equations 68 and 70:

$$\ddot{e}_p = (a_x + \dot{\psi} u_y)\sin e_\psi + (a_y + \dot{\psi} u_x)\cos e_\psi + \dot{e}_\psi(u_x \cos e_\psi + u_y \sin e_\psi) \quad \text{(Equation 71)}$$

$$\dot{e}_v = (a_x + \dot{\psi} u_y)\cos e_\psi - (a_y - \dot{\psi} u_x)\sin e_\psi + \dot{e}_\psi(u_x \sin e_\psi + u_y \cos e_\psi) - \dot{v}_{ref} \quad \text{(Eq. 72)}$$

Acceleration components $a_x$ and $a_y$ are used, together with the heading acceleration $\ddot{\psi}$, as virtual control inputs. Suppose that $a_x$, $a_y$, and $\ddot{\psi}$ are selected as in Equations 73-75:

$$a_x = \mu_p(e)\sin e_\psi + \mu_v(e)\cos e_\psi - u_y \dot{\psi}_{ref} \quad \text{(Equation 73)}$$

$$a_y = \mu_p(e)\cos e_\psi - \mu_v(e)\sin e_\psi + u_x \dot{\psi}_{ref} \quad \text{(Equation 74)}$$

$$\ddot{\psi} = \mu_\psi(e) \quad \text{(Equation 75)}$$

In Equations 73-75, $\mu_p(\cdot)$, $\mu_v(\cdot)$, and $\mu_\psi(\cdot)$ are control laws. The particular structure of the control law $\mu_\psi(\cdot)$ induces the specific car dynamics; for $k_{\psi p} \neq 0$ the cross-track error $e_p \neq 0$ will make the car yaw.

The control laws given in Equations 73-75 are defined as functions of the tracking error vector given in Equation 76:

$$e := [e_p, \dot{e}_p, e_v, e_\psi, \dot{e}_\psi]^T \quad \text{(Equation 76)}$$

Substituting $a_x$ and $a_y$ in Equations 71-72 with Equations 73-74 gives the position and velocity error dynamics shown in Equations 77-78:

$$\ddot{e}_p = \mu_p(e) \quad \text{(Equation 77)}$$

$$\dot{e}_p = \mu_v(e) - \dot{v}_{ref} \quad \text{(Equation 78)}$$

The heading error dynamics reduce as shown in Equation 79:

$$\ddot{e}_p = \mu_\psi(e) - \ddot{v}_{ref} \quad \text{(Equation 79)}$$

Finally, control laws $\mu_p(\cdot)$, $\mu_v(\cdot)$ and $\mu_\psi(\cdot)$ are chosen as shown in Equations 80-82.

$$\mu_p(e) = k_{pp} e_p + k_{p\dot{p}} \dot{e}_p \quad \text{(Equation 80)}$$

$$\mu_v(e) = k_{vv} e_v + \dot{v}_{ref} \quad \text{(Equation 81)}$$

$$\mu_\psi(e) = k_{\psi p} e_p + k_{\psi\psi} e_\psi + k_{\psi\dot{\psi}} \dot{e}_\psi + \ddot{\psi}_{ref} \quad \text{(Equation 82)}$$

Utilizing the control laws of Equations 80-82 results in the error dynamics given by Equation 83:

$$\frac{d}{dt}\begin{bmatrix} e_p \\ \dot{e}_p \\ e_v \\ e_\psi \\ \dot{e}_\psi \end{bmatrix} = \begin{bmatrix} 0 & 1 & 0 & 0 & 0 \\ k_{pp} & k_{p\dot{p}} & 0 & 0 & 0 \\ 0 & 0 & k_{vv} & 0 & 0 \\ 0 & 0 & 0 & 0 & 1 \\ k_{\psi p} & 0 & 0 & k_{\psi\psi} & k_{\psi\dot{\psi}} \end{bmatrix} \quad \text{(Equation 83)}$$

In Equation 83, $k_{pp}$, $k_{p\dot{p}}$, $k_{vv}$, $k_{\psi p}$, and $k_{\psi\dot{\psi}}$ are gain values. Choosing the gain values appropriately will result in exponentially stable error dynamics.

Figure 12:
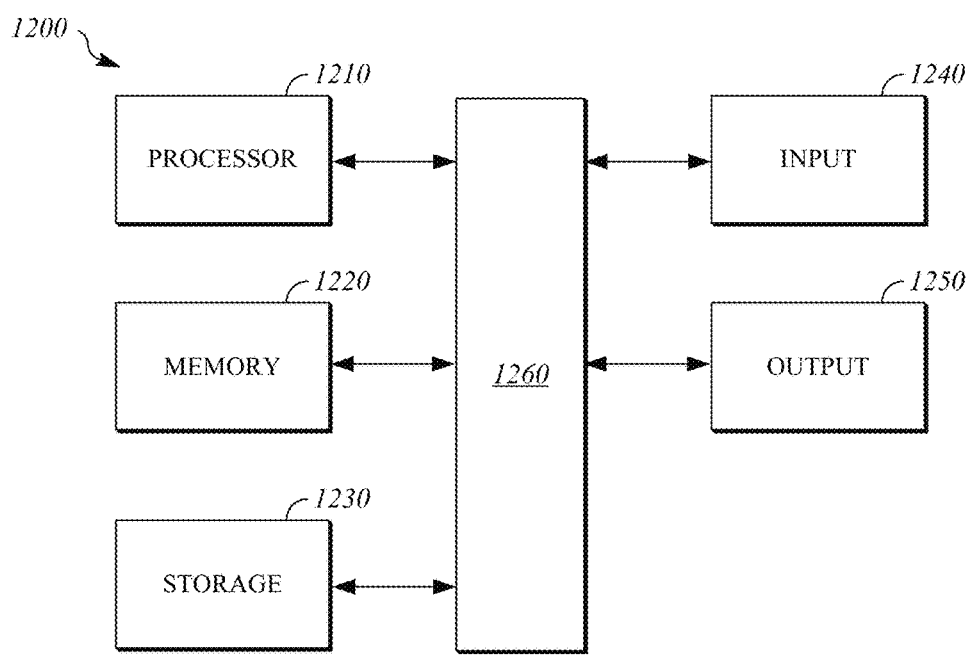
FIG. 12 is an illustration showing a controller.

FIG. 12 shows an exemplary hardware configuration for a controller 1200 that may be used to implement the apparatuses and systems described herein. As an example, controller 1200 may be used to implement the vehicle control system 330 and/or individual components of the vehicle control system 330.

The controller 1200 may include a processor 1210, a memory 1220, a storage device 1230, one or more input devices 1240, and one or more output devices 1250. The controller 1200 may include a bus 1260 or a similar device to interconnect the components for communication. The processor 1210 is operable to execute computer program instructions and perform operations described by the computer program instructions. As an example, the processor 1210 may be a conventional device such as a central processing unit. The memory 1220 may be a volatile, high-speed, short-term information storage device such as a random-access memory unit. The storage device 1230 may be a non-volatile information storage device such as a hard drive or a solid-state drive. The input devices 1240 may include any type of human-machine interface such as buttons, switches, a keyboard, a mouse, a touchscreen input device, a gestural input device, or an audio input device. The output devices 1250 may include any type of device operable to provide an indication to a user regarding an operating state, such as a display screen or an audio output.

Figure 13:
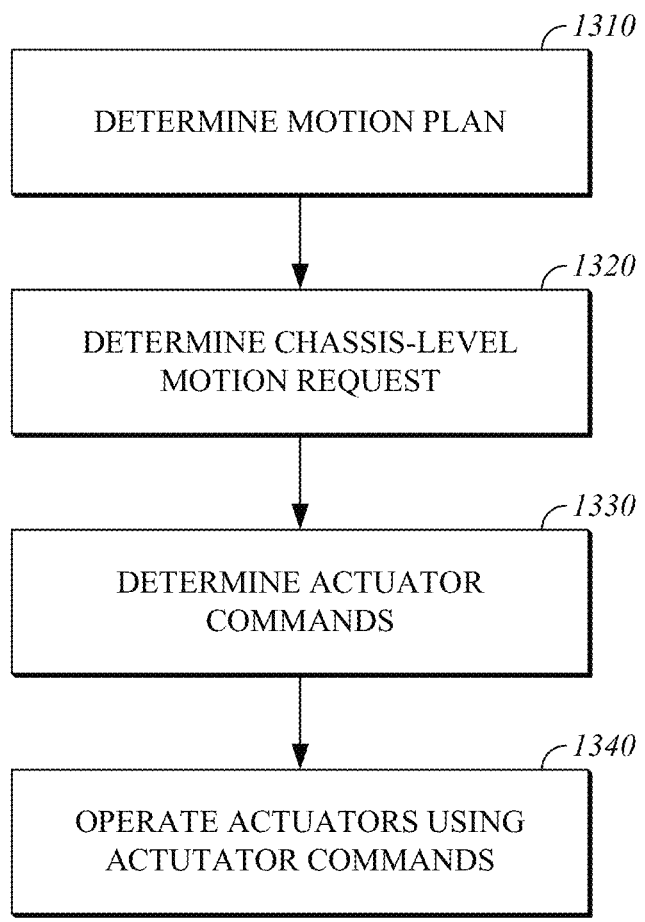
FIG. 13 is a flowchart that shows a vehicle control process.

FIG. 13 is a flowchart that shows a vehicle control process 1300. The vehicle control process 1300 may be implemented using, for example, the vehicle control system 330.

In operation 1310, a motion plan is determined. The motion plan describes, for example, an intended direction of travel and an intended speed of travel for the vehicle 100. The motion plan may include, as examples, one or more waypoints, a mathematical description of a desired path of travel for the vehicle 100, and/or one or more desired vehicle speeds for the vehicle 100 at specified locations along the desired path of travel for the vehicle 100. The motion plan may be determined based on an intended destination for the vehicle 100, where the intended destination may be an ultimate destination specified by a navigation route, or may be an intermediate point, such as a waypoint along a navigation route. The motion plan may be determined, for example, as described with respect to the vehicle intelligence unit 332.

In operation 1320, a chassis-level motion request is determined. The chassis-level motion request describes motion of the chassis of the vehicle 100 that is intended to cause the vehicle 100 to the follow the path described by the motion plan that was determined in operation 1310, or to return to the motion plan if the position and/or speed of the vehicle 100 has deviated from the motion plan. The requested chassis level motion may be determined using a vehicle dynamics model to determine a controllable motion of the vehicle 100 that will result in following and/or returning to the path described by the motion plan. As previously described, the chassis-level motion request may include chassis-level accelerations expressed in six degrees of freedom. The chassis-level motion request may be determined, for example, as described with respect to the vehicle motion control unit 340.

The information included in the chassis-level motion request is at a higher level of specificity than the information included in the motion plan. Whereas the motion plan may be in the form of information such as a heading angle and a desired speed, the chassis level motion request may be in the form of chassis-level velocities and/or accelerations in multiple degrees of freedom. As examples, the chassis-level motion request may be described in terms of six degree of freedom chassis velocity, six degree of freedom chassis acceleration, six degree of freedom chassis acceleration and curvature, or six degree of freedom chassis acceleration scaled for velocity.

Determining the chassis-level motion request in operation 1320 may be performed at a higher frequency than determining the motion plan in operation 1310. As an example, the frequency of determining the chassis-level motion request by be between ten and one hundred times higher than the frequency of determining the motion plan.

In operation 1330, actuator commands are determined. The actuator commands may include commands for each of the vehicle actuators, such as braking actuator commands for each of multiple (e.g., four) braking actuators of the vehicle 100, one or more steering actuator commands, one or more propulsion actuator commands, and commands for other types of vehicle actuators.

The actuator commands may be determined for the vehicle actuators based on the chassis-level motion request. The effort of each of the actuators may be coordinated in a manner that causes the combined effort of the actuators, in response to the actuator commands, to cause motion of the vehicle 100 that is consistent with the chassis level motion request. Furthermore, the combined effort of the available actuators may be utilized to satisfy the chassis-level motion request, while optimizing usage of the various actuators. As examples, actuator usage may be optimized to favor minimizing energy usage, actuator usage may be optimized to favor maximizing performance, or actuator usage may be optimized to favor maximizing comfort.

The actuator commands may be further based on actuator identity information that describes presently available actuators from the plurality of vehicle actuators. The actuator identity information may be received, for example, in the form of messages transmitted by the actuators, either under their own direction or in response to an interrogation message received from another component such as the integrated chassis control system 342. Thus, the integrated chassis control system 342 may determine actuator commands for the plurality of vehicle actuators based actuator identity information that describes presently available actuators from the plurality of vehicle actuators. Determining the actuator commands based on presently available actuators allows the vehicle control system 330 to be used with varying actuator configurations, since the output from the vehicle motion control unit 340 may be actuator agnostic and the integrated chassis control system 342 is able to adapt to the available actuators and modify control strategies as needed.

Determining the actuator commands based on presently available actuators also allows the vehicle control system 330 to be fault-tolerant. If an actuator becomes unavailable, for example, as a result of a complete failure or temporary condition, the control strategy utilized by the integrated chassis control system 342 may be modified to account for the change, such as by utilizing the abilities of the remaining actuators differently.

In addition to information that describes presently available actuators, actuator commands may be determined based on information describing actuation limits for each actuator of the vehicle actuators. The information describing actuation limits may be transmitted from the plurality of vehicle actuators to the integrated chassis control system 342. As examples the actuators may include the suspension actuators 346, the steering actuators 348, the drive actuators 350, and the brake actuators 352. The integrated chassis control system 342 may receive information describing propulsion actuation limits from the drive actuators 350, the integrated chassis control system 342 may receive information describing steering actuation limits from the steering actuators 348, the integrated chassis control system 342 may receive information describing suspension actuation limits from the suspension actuators 346, and the integrated chassis control system 342 may receive information describing braking actuation limits from the brake actuators 352.

Determining the actuator commands in operation 1330 may be performed, for example, in the manner described with respect to the integrated chassis control system 342.

In operation 1340, the vehicle actuators are operated using the actuator commands. For example, the actuator commands may be transmitted to the vehicle actuators and interpreted or otherwise utilized to control the current states of the vehicle actuators. The actuator commands may describe, as examples, positions for the actuators, pressures for the actuators, and/or forces for the actuators. The actuator commands may be expressed in a form that, when interpreted by control hardware associated with each actuator, will cause the respective actuator to operate in accordance with the actuator command, such as by changing a position or magnitude of a characteristic of the actuator.

Figure 14:
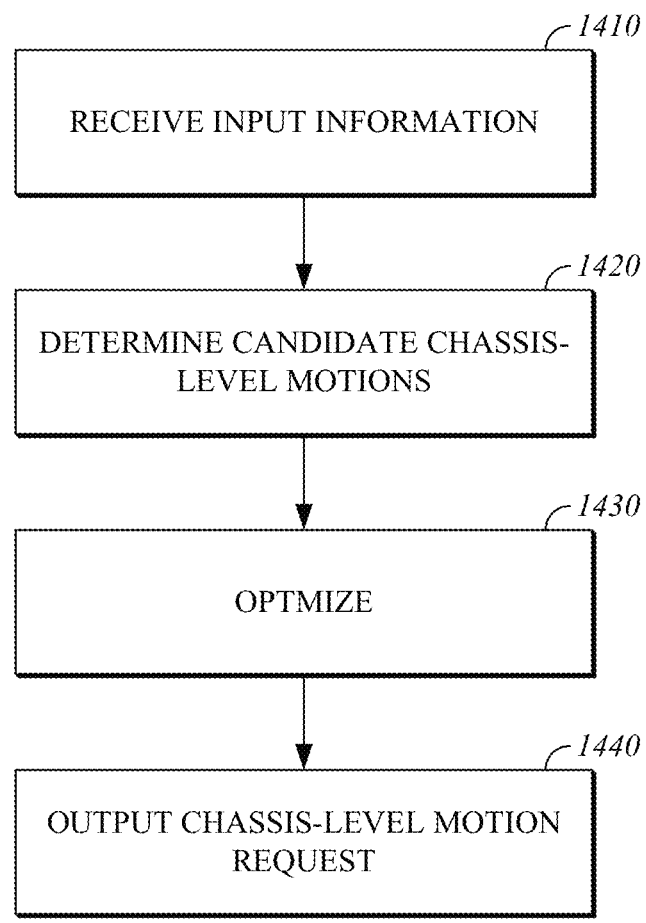
FIG. 14 is a flowchart that shows a process for determining the chassis level motion request.

FIG. 14 is a flowchart that shows an example of a process 1400 for determining the chassis level motion request of operation 1320 of FIG. 13.

Operation 1410 includes receiving input information. The input information may include, as examples, the motion plan, and the capability envelope 338.

Operation 1420 includes determining candidate chassis-level motions. Determining the candidate chassis level motions may include using a vehicle dynamics model to identify candidate chassis level motions that will cause the vehicle 100 to follow or return to the path that is described by the motion plan.

In operation 1430, the candidate chassis-level motions are optimized. Operation 1430 may be performed concurrently with operation 1420, as part of a single optimization process, may be performed subsequent to operation 1420, or operations 1420 and 1430 may be performed iteratively in order to refine the candidate chassis-level motions and identify an optimal solution.

Operation 1430 may include optimizing the candidate chassis level motions by minimizing a deviation relative to the path described by the motion plan. Thus, the path that will result from particular candidate chassis-level motions may be determined and compared to the motion plan, and the candidate chassis-level motions may be revised and re-analyzed in order to reduce the deviation. In some embodiments, the optimization performed in operation 1430 utilizes a cost function, and a cost may be assessed for deviations from the path described by the motion plan. As an example, the cost may be dependent upon a degree of deviation from the path.

Operation 1430 may also include optimizing the candidate chassis-level motions based in part on a feasible range of chassis-level motions. The feasible range of chassis-level motions may be as described previously with respect to the capability envelope 338. In some embodiments, the feasible range of chassis-level accelerations determined based on current states for the vehicle actuators of the vehicle 100. In some embodiments, the feasible range of chassis-level accelerations based in part on actuation limits for each of the vehicle actuators of the vehicle 100. As an example, the vehicle state estimation unit 336 may determine a magnitude of actuator effort that can be contributed by each of the vehicle actuators, determine the feasible range of chassis-level accelerations based on this information, and provide information describing the feasible range of chassis-level accelerations for use in optimization of the candidate chassis level motions. Thus, for example, the magnitude of acceleration that may be provided can be obtained from the propulsion components 112, where the magnitude of acceleration may be limited by a current state of charge of a battery pack of the vehicle 100 in embodiments where the propulsion components 112 include electric motors. In some embodiments, the feasible range of chassis-level motions is determined based in part of friction available at the road wheels 104.

Operation 1440 includes outputting the chassis-level motion request, such as by transmitting information describing the chassis-level motion request to the integrated chassis control system 342. The chassis-level motion request may be in any suitable form. As an example, the chassis-level motion request may include chassis-level accelerations expressed in six degrees of freedom, as previously described.

In some embodiments, the feasible range of chassis-level motions utilized in the process 1400 may vary spatially and/or temporally. The calculation and information described with respect to the capability envelope may be calculated to account for position-dependent changes and time dependent changes.

Figure 15:
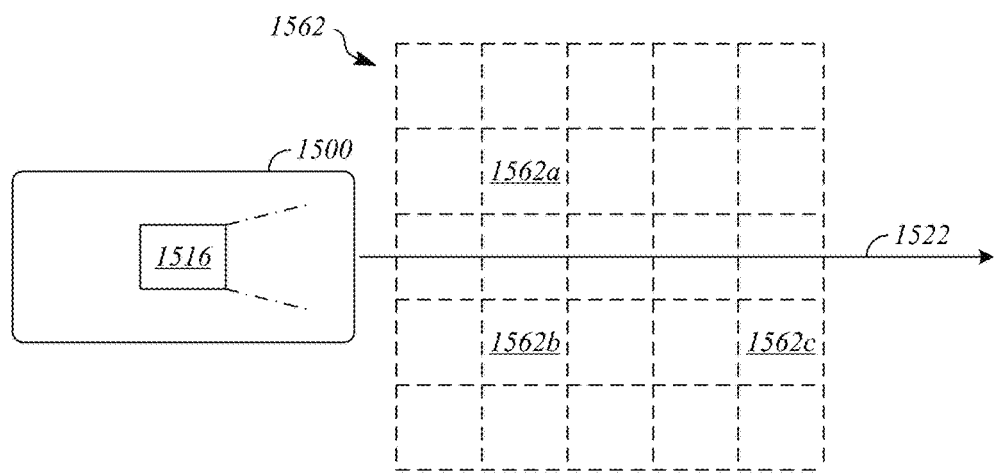
FIG. 15 is an illustration that shows a plurality of capability zones along a path.

FIG. 15 is an illustration that shows a plurality of capability zones 1562 that may be defined along and/or adjacent to a path 1522 that is being traversed by a vehicle 1500. The vehicle 1500 may obtain information describing the conditions ahead of the vehicle 1500 on a zone-by-zone basis using, for example, one or more sensors 1516. As an example, a road surface condition may be assessed for each of the capability zones 1562 based on, for example, road surface material, presence of water, presence of snow, or presence of a rough pavement surface. The feasible chassis-level motions can then be modified to account for the conditions in each of the zones. Thus, the information describing the feasible range of chassis-level accelerations may include at least a first set of feasible ranges of chassis-level accelerations that correspond to a first location on a roadway and a second set of feasible ranges of chassis-level accelerations that correspond to a second location on the roadway.

As one example, the differing conditions may exist in a first location such as a first zone 1562a and a second zone 1562b that is spaced laterally from the first zone 1562a. The two zones, when traversed by the vehicle 1500 may affect friction available at different pairs of road wheels on account of, for example, differing amounts of water present in the first zone 1562a as compared to the second zone 1562b. As another example, different conditions may be present in the second zone 1562b as compared to a third zone 1562c that is longitudinally spaced from the second zone 1562b (i.e., further along the path 1522). The feasible chassis motions for the second zone 1562b and the third zone 1562c may differ, and the feasible chassis motions at the each of the second zone 1562b and the third zone 1562c may be limited by conditions at the other zone.

Figure 16:
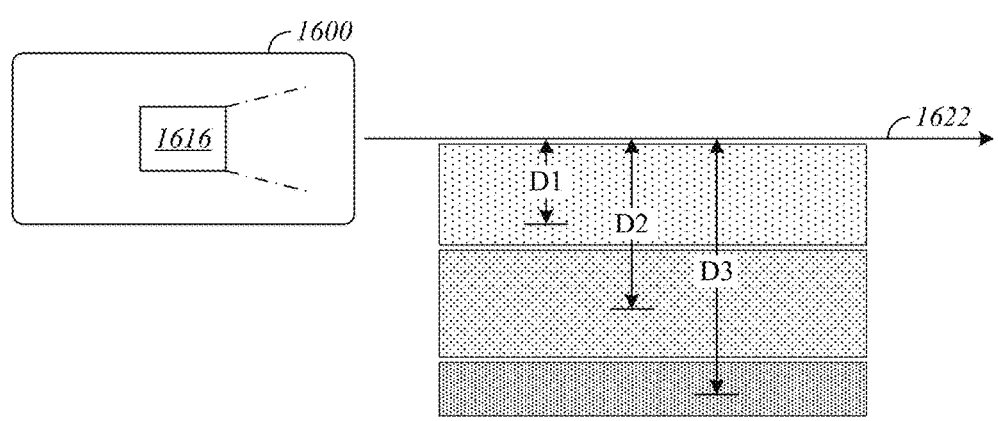
FIG. 16 is an illustration that shows deviation zones along a path.

In some embodiments, the process 1400 may apply a flexible weighting scheme when assessing deviations from the path described by the motion plan. As example, some deviations may be determined to be acceptable in place of the path described by the motion plan. FIG. 16 is an illustration that shows deviation zones including a first deviation zone 1664, a second deviation zone 1665, and a third deviation zone 1666 along a path 1622 for a vehicle 1600. The deviation zones may each be associated with a different degree (e.g., distance) of deviation from the path 1622 and may each be associated with a different resulting circumstance, such as by imposition of a cost in a cost function, or by being designated as traversable or non-traversable. These circumstances, such as classifications or costs, may be determined using one or more sensors 1616 of the vehicle 1600. Although the first deviation zone 1664, the second deviation zone 1665, and the third deviation zone 1666 are shown as having a fixed width relative to the path 1622, it should be understood that they could have any geometrical configuration.

In the illustrated example, a deviation from the path 1622 by a first distance D1 would place the vehicle in the first deviation zone 1664, a larger deviation from the path 1622 by a second distance D2 would place the vehicle in the second deviation zone 1665, and a further deviation from the path 1622 by a third distance D3 would place the vehicle in the third deviation zone 1666. The first deviation zone 1664 may be indicated as traversable and may be associated with a zero-magnitude cost for deviation from the path 1622, indicating that the optimization performed by the vehicle motion control unit 340 may ignore deviations that lie within the first deviation zone 1664, such as by assigning them zero cost in a cost function. The second deviation zone 1665 may be indicated as traversable and associated with a small or moderate cost. As an example, the second deviation zone 1665 may correspond to poor road surface conditions or a large deviation relative to the center of a travel lane. The third deviation zone 1666 may be indicated as non-traversable and/or may be associated with a high cost to be applied in a cost function. As examples, the third deviation zone 1666 may represent presence of a fixed object, or departure from a roadway surface.

What is claimed is:

1. A control system for a vehicle, comprising:
a plurality of vehicle actuators that are operable to affect actual chassis-level accelerations;
a vehicle intelligence unit that determines a motion plan, wherein the vehicle intelligence unit determines the motion plan based on an intended destination, and wherein the motion plan describes an intended path for the vehicle from a current location of the vehicle to the intended destination;
a vehicle motion control unit that receives the motion plan, receives information describing a feasible range of chassis-level accelerations and determines a chassis-level motion request based on the motion plan and the feasible range of chassis-level accelerations, wherein the chassis-level motion request includes requested chassis-level accelerations, and wherein, in response to a determination that the intended path described by the motion plan is not feasible, the vehicle motion control unit determines the chassis-level motion request to constrain a deviation from the motion plan and constrain the requested chassis-level accelerations based on the feasible range of chassis-level accelerations; and
a chassis control unit that determines actuator commands for the plurality of vehicle actuators based on the chassis-level motion request and controls operation of the plurality of vehicle actuators using the actuator commands.

2. The control system of claim 1, wherein the feasible range of chassis-level accelerations is determined based on current states for the plurality of vehicle actuators.

3. The control system of claim 1, wherein the feasible range of chassis-level accelerations is based in part on actuation limits for each of the plurality vehicle of actuators.

4. The control system of claim 1, wherein the chassis-level motion request is determined using a vehicle dynamics model.

5. The control system of claim 1, wherein the requested chassis-level accelerations are expressed in six degrees of freedom.

6. The control system of claim 1, further comprising:
sensors that obtain information describing the conditions ahead of the vehicle at a first location on a roadway and at a second location on the roadway, wherein the information describing the feasible range of chassis-level accelerations includes at least a first set of feasible ranges of chassis-level accelerations that are determined using the information describing the conditions ahead of the vehicle at the first location on the roadway and a second set of feasible ranges of chassis-level accelerations that are determined using the information describing the conditions ahead of the vehicle at the second location on the roadway.

7. The control system of claim 1, wherein the chassis control unit transmits the actuator commands to the plurality of vehicle actuators to cause operation of the plurality of vehicle actuators in accordance with the actuator commands.

8. The control system of claim 1, wherein the intended path for the vehicle that is included in the motion plan describes an intended direction of travel and an intended speed of travel.

9. A method for controlling a vehicle, comprising:
determining a motion plan based on an intended destination, wherein the motion plan describes an intended path for the vehicle from a current location of the vehicle to the intended destination;
determining a chassis-level motion request based on the motion plan and information describing a feasible range of chassis-level accelerations, wherein the chassis-level motion request includes requested chassis-level accelerations, and wherein, in response to a determination that the intended path described by the motion plan is not feasible, the chassis-level motion request is determined to constrain a deviation from the motion plan and constrain the requested chassis-level accelerations based on the feasible range of chassis-level accelerations; and
determining actuator commands for a plurality of vehicle actuators based on the chassis-level motion request; and
controlling operation of the plurality of vehicle actuators using the actuator commands.

10. The method of claim 9, wherein the feasible range of chassis-level accelerations is determined based on current states for the plurality of vehicle actuators.

11. The method of claim 9, wherein the feasible range of chassis-level accelerations is based in part on actuation limits for each of the plurality vehicle of actuators.

12. The method of claim 9, wherein the chassis-level motion request is determined using a vehicle dynamics model.

13. The method of claim 9, wherein the requested chassis-level accelerations are expressed in six degrees of freedom.

14. The method of claim 9, wherein the information describing the feasible range of chassis-level accelerations includes at least a first set of feasible ranges of chassis-level accelerations that are determined using information describing conditions ahead of the vehicle at the first location on the roadway and a second set of feasible ranges of chassis-level accelerations that are determined using information describing the conditions ahead of the vehicle at a second location on the roadway.

15. The method of claim 9, further comprising:
transmitting the actuator commands to the plurality of vehicle actuators to cause operation of the plurality of vehicle actuators in accordance with the actuator commands.

16. The method of claim 9, wherein the intended path for the vehicle that is included in the motion plan describes an intended direction of travel and an intended speed of travel.

17. A non-transitory computer-readable storage device including program instructions executable by one or more processors that, when executed, cause the one or more processors to perform operations, the operations comprising:
determining a motion plan based on an intended destination, wherein the motion plan describes an intended path for the vehicle from a current location of the vehicle to the intended destination;
determining a chassis-level motion request based on the motion plan and information describing a feasible range of chassis-level accelerations, wherein the chassis-level motion request includes requested chassis-level accelerations, and wherein, in response to a determination that the intended path described by the motion plan is not feasible, the chassis-level motion request is determined to constrain a deviation from the motion plan and constrain the requested chassis-level accelerations based on the feasible range of chassis-level accelerations;
determining actuator commands for a plurality of vehicle actuators based on the chassis-level motion request; and
controlling operation of the plurality of vehicle actuators using the actuator commands.

18. The non-transitory computer-readable storage device of claim 17, wherein:
the feasible range of chassis-level accelerations is determined based on current states for the plurality of vehicle actuators,
the feasible range of chassis-level accelerations is based in part on actuation limits for each of the plurality vehicle of actuators,
the chassis-level motion request is determined using a vehicle dynamics model,
the requested chassis-level accelerations are expressed in six degrees of freedom,
the information describing the feasible range of chassis-level accelerations includes at least a first set of feasible ranges of chassis-level accelerations that are determined using information describing conditions ahead of the vehicle at the first location on the roadway and a second set of feasible ranges of chassis-level accelerations that are determined using information describing the conditions ahead of the vehicle at a second location on the roadway, the actuator commands are transmitted to the plurality of vehicle actuators to cause operation of the plurality of vehicle actuators in accordance with the actuator commands, the intended path that is included in the motion plan describes an intended direction of travel, and the intended path that is included in the motion plan describes an intended speed of travel.

* * * * *